(12) United States Patent
Woytowitz

(10) Patent No.: US 11,254,060 B2
(45) Date of Patent: *Feb. 22, 2022

(54) SYSTEMS AND METHODS FOR DETERMINING TOOL PATHS IN THREE-DIMENSIONAL PRINTING

(71) Applicant: Arevo, Inc., Milpitas, CA (US)

(72) Inventor: Peter John Woytowitz, Los Altos, CA (US)

(73) Assignee: Arevo, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/431,425

(22) Filed: Jun. 4, 2019

(65) Prior Publication Data
US 2019/0389134 A1    Dec. 26, 2019

Related U.S. Application Data

(63) Continuation of application No. 16/052,945, filed on Aug. 2, 2018, now Pat. No. 10,363,704, which is a
(Continued)

(51) Int. Cl.
*B29C 64/393*    (2017.01)
*B33Y 50/02*    (2015.01)
(Continued)

(52) U.S. Cl.
CPC ......... *B29C 64/393* (2017.08); *B29C 64/386* (2017.08); *B33Y 50/00* (2014.12);
(Continued)

(58) Field of Classification Search
None
See application file for complete search history.

(56) References Cited

U.S. PATENT DOCUMENTS 5,093,610 A    3/1992  Bailey
5,675,229 A    10/1997 Thorne
(Continued)

FOREIGN PATENT DOCUMENTS

EP    3045992 A1    7/2016
EP    3051445 A1    8/2016
(Continued)

OTHER PUBLICATIONS

G.Q. Jin, W.D. Li, L. Gao, An adaptive process planning approach of rapid prototyping and manufacturing, Robotics and Computer-Integrated Manufacturing, vol. 29, Issue 1, 2013, pp. 23-38, (http://www.sciencedirect.com/science/article/pii/S0736584512000853) (Year: 2013).*

(Continued)

*Primary Examiner* — Kenneth M Lo
*Assistant Examiner* — Istiaque Ahmed
(74) *Attorney, Agent, or Firm* — Jing Wang; Kenneth Ottesen

(57) ABSTRACT

The present disclosure provides methods and systems for printing a three-dimensional (3D) object. A method for printing a 3D object may comprise receiving a computer model of the 3D object in computer memory and generating a parametric representation of the computer model of the 3D object. Next, a first edge in a parametric representation of a curved surface of the computer model may be selected, and a 3D tool path may be generated at least in part by: (i) selecting a first set of points on the first edge; and (ii) computing coordinates of a second set of points on a second edge parallel to the first edge in the parametric representation, wherein the first edge and the second edge define the 3D tool path. Printing instructions may then be generated for printing at least a portion of the 3D object along the tool path.

15 Claims, 11 Drawing Sheets

Related U.S. Application Data continuation of application No. PCT/US2018/032805, filed on May 15, 2018.

(60) Provisional application No. 62/506,308, filed on May 15, 2017.

(51) Int. Cl.
*B33Y 50/00* (2015.01)
*B29C 64/386* (2017.01)
*G06T 17/20* (2006.01)
*G05B 19/4099* (2006.01)

(52) U.S. Cl.
CPC .............. *B33Y 50/02* (2014.12); *G06T 17/20* (2013.01); *G05B 19/4099* (2013.01); *G05B 2219/49007* (2013.01); *G05B 2219/49023* (2013.01)

(56) References Cited

U.S. PATENT DOCUMENTS

| | | |
|---|---|---|
| 6,441,342 B1 | 8/2002 | Hsu |
| 6,814,907 B1 | 11/2004 | Comb |
| 6,823,230 B1 | 11/2004 | Jamalabad et al. |
| 7,024,272 B2 | 4/2006 | Thomas et al. |
| 7,483,818 B2 | 1/2009 | Amakai et al. |
| 8,308,876 B2 | 11/2012 | Woods et al. |
| 9,533,451 B2 | 1/2017 | Folgar et al. |
| 9,592,660 B2 | 3/2017 | Reese et al. |
| 9,595,037 B2 | 3/2017 | Glasgow et al. |
| 9,656,429 B1 | 5/2017 | Mantha et al. |
| 9,724,877 B2 | 8/2017 | Flitsch et al. |
| 9,895,845 B2 | 2/2018 | Bheda et al. |
| 9,908,978 B2 | 3/2018 | Reese et al. |
| 10,052,813 B2 | 8/2018 | Armijo et al. |
| 10,274,934 B2 | 4/2019 | Chang et al. |
| 10,363,704 B2 | 7/2019 | Woytowitz |
| 10,421,267 B2 | 9/2019 | Reese et al. |
| 2002/0171703 A1 | 11/2002 | Phillips et al. |
| 2003/0236588 A1 | 12/2003 | Jang et al. |
| 2007/0242067 A1 | 10/2007 | Sharma et al. |
| 2009/0284528 A1 | 11/2009 | Jensen et al. |
| 2010/0312364 A1 | 12/2010 | Eryilmaz et al. |
| 2011/0061591 A1 | 3/2011 | Stecker |
| 2013/0101728 A1 | 4/2013 | Keremes et al. |
| 2013/0196060 A1 | 8/2013 | Pla et al. |
| 2013/0316081 A1 | 11/2013 | Kovalcik et al. |
| 2014/0232035 A1 | 8/2014 | Bheda |
| 2014/0277669 A1 | 9/2014 | Nardi et al. |
| 2014/0291893 A1 | 10/2014 | Hopkins et al. |
| 2014/0328963 A1 | 11/2014 | Mark et al. |
| 2014/0336808 A1 | 11/2014 | Taylor et al. |
| 2014/0371895 A1 | 12/2014 | Sadusk et al. |
| 2015/0045928 A1 | 2/2015 | Perez et al. |
| 2015/0052025 A1 | 2/2015 | Apsley et al. |
| 2015/0165681 A1 | 6/2015 | Fish et al. |
| 2015/0235069 A1 | 8/2015 | Kumar et al. |
| 2015/0242564 A1 | 8/2015 | Chang et al. |
| 2015/0246488 A1 | 9/2015 | Boettcher et al. |
| 2015/0251356 A1 | 9/2015 | Batchelder et al. |
| 2015/0273583 A1 | 10/2015 | Bumgardner |
| 2015/0321418 A1 | 11/2015 | Sterman et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336292 A1 | 11/2015 | Mikulak et al. |
| 2015/0360288 A1 | 12/2015 | Zalewski et al. |
| 2016/0075089 A1 | 3/2016 | Duro et al. |
| 2016/0086376 A1 | 3/2016 | Tang et al. |
| 2016/0144565 A1 | 5/2016 | Mark et al. |
| 2016/0151833 A1 | 6/2016 | Tsao |
| 2016/0159012 A1 | 6/2016 | Lee et al. |
| 2016/0176118 A1 | 6/2016 | Reese et al. |
| 2016/0185044 A1 | 6/2016 | Leonard et al. |
| 2016/0193785 A1 | 7/2016 | Bell et al. |
| 2016/0236279 A1 | 8/2016 | Ashton et al. |
| 2016/0236414 A1 | 8/2016 | Reese et al. |
| 2016/0236416 A1 | 8/2016 | Bheda et al. |
| 2016/0236419 A1 | 8/2016 | Griffin et al. |
| 2016/0266572 A1* | 9/2016 | Chang .................. B33Y 50/00 |
| 2016/0266573 A1 | 9/2016 | Bheda et al. |
| 2016/0271880 A1 | 9/2016 | Bheda et al. |
| 2016/0297142 A1 | 10/2016 | Bheda et al. |
| 2016/0297935 A1 | 10/2016 | Reese et al. |
| 2016/0332366 A1 | 11/2016 | Donovan |
| 2016/0375635 A1 | 12/2016 | Tomuta |
| 2017/0031639 A1 | 2/2017 | Cudak et al. |
| 2017/0096576 A1 | 4/2017 | Bheda et al. |
| 2017/0198104 A1 | 7/2017 | Bheda et al. |
| 2017/0341183 A1 | 11/2017 | Buller et al. |
| 2017/0351245 A1* | 12/2017 | Zhang ................ G05B 19/4099 |
| 2018/0043635 A1 | 2/2018 | Mantha et al. |
| 2018/0147783 A1 | 5/2018 | Bheda et al. |
| 2018/0300491 A1 | 10/2018 | Leach et al. |
| 2018/0319085 A1* | 11/2018 | Dasappa ................ B33Y 50/00 |
| 2018/0370145 A1 | 12/2018 | Woytowitz |
| 2020/0016883 A1 | 1/2020 | Reese et al. |
| 2020/0156323 A1 | 5/2020 | Woytowitz et al. |
| 2020/0247057 A1 | 8/2020 | Bheda et al. |
| 2020/0307174 A1 | 10/2020 | Woytowitz et al. |

FOREIGN PATENT DOCUMENTS

| | | | |
|---|---|---|---|
| EP | 3234709 | A1 | 10/2017 |
| JP | 5065299 | B2 | 10/2012 |
| KR | 20130060144 | A | 6/2013 |
| WO | WO-2015038072 | A1 | 3/2015 |
| WO | WO-2015042422 | A1 | 3/2015 |
| WO | 2015/120429 | A1 | 8/2015 |
| WO | WO-2016196382 | A1 | 12/2016 |
| WO | WO-2017077508 | A1 | 5/2017 |
| WO | WO-2017210490 | A1 | 12/2017 |
| WO | WO-2018031594 | A1 | 2/2018 |
| WO | WO-2018213334 | A1 | 11/2018 |

OTHER PUBLICATIONS

EP application No. 17840170.9, "Extended European search report," dated Mar. 3, 2020.

U.S. Appl. No. 15/479,055, Office action dated Mar. 5, 2020.

U.S. Appl. No. 15/479,055 Office Action dated Sep. 18, 2019.

U.S. Appl. No. 15/479,055, Office action dated Jun. 19, 2020.

Chakraborty, et al. Extruder path generation for Curved Layer Fused Deposition Modeling. Computer-Aided Design vol. 40, Issue 2, Feb. 2008, pp. 235-243. Received Mar. 13, 2007; accepted Oct. 28, 2007.

Clausen, et al. Exploiting Additive Manufacturing Infill in Topology Optimization for Improved Buckling Load. Engineering 2.2 (2016): 250-257.

International search report and written opinion dated Nov. 22, 2017 for PCT Application No. PCT/US2017/045986.

Jin, et al. Modeling and process planning for curved layer fused deposition. Int J Adv Manuf Technol (2017) 91: 273. https://doi.org/10.1007/s00170-016-9743-5.Received Jul. 22, 2016; Accepted Nov. 7, 2016; First Online Nov. 18, 2016.

Jin, et al. Optimization of tool-path generation for material extrusion-based additive manufacturing technology. Additive Manufacturing vol. 1-4, Oct. 2014, pp. 32-47.DOI10.1016/j.addma.2014.08.004; Available online Sep. 16, 2014.

Notice of allowance dated Jan. 4, 2017 for U.S. Appl. No. 15/232,767.

Notice of allowance dated Apr. 27, 2017 for U.S. Appl. No. 15/232,767.

Notice of allowance dated Nov. 30, 2017 for U.S. Appl. No. 14/623,471.

Office action dated Mar. 30, 2017 for U.S. Appl. No. 14/623,471.

Office action dated Aug. 30, 2017 for U.S. Appl. No. 14/623,471.

Office action dated Sep. 14, 2017 for U.S. Appl. No. 14/621,205.

Office action dated Nov. 14, 2016 for U.S. Appl. No. 15/232,767.

(56) References Cited

OTHER PUBLICATIONS

PCT/US2018/032805 International Search Report and Written Opinion dated Sep. 21, 2018.
Stamati, et al. Building Editable B-rep Models from Unorganized Point Clouds. Noname manuscript No. TR-CS-2010-04, Jul. 7, 2010 (Year: 2010).
U.S. Appl. No. 14/621,205 Notice of Allowance dated May 1, 2019.
U.S. Appl. No. 14/621,205 Office Action dated Apr. 13, 2018.
U.S. Appl. No. 14/621,205 Office Action dated Jan. 14, 2019.
U.S. Appl. No. 14/621,205 Second Notice of Allowance dated Aug. 12, 2019.
U.S. Appl. No. 15/864,425 Office Action dated May 24, 2019.
U.S. Appl. No. 16/052,945 Notice of Allowance dated Mar. 6, 2019.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
U.S. Appl. No. 15/864,425 Notice of Allowance dated Oct. 2, 2019.
U.S. Appl. No. 16/523,821, Office action dated Jan. 11, 2021.
U.S. Appl. No. 16/523,821, Notice of Allowance dated Apr. 26, 2021.
U.S. Appl. No. 16/722,207, Office action dated Apr. 30, 2021.
U.S. Appl. No. 16/722,207, Notice of Allowance and Fee(s) Due, dated Jul. 1, 2021.
U.S. Appl. No. 16/495,383, Requirement for Restriction/Election, dated Oct. 20, 2021.

\* cited by examiner

SYSTEMS AND METHODS FOR DETERMINING TOOL PATHS IN THREE-DIMENSIONAL PRINTING

CROSS-REFERENCE

The present application is a continuation of U.S. patent application Ser. No. 16/052,945, filed Aug. 2, 2018, which is a continuation of International Application No. PCT/US2018/032805, filed May 15, 2018, which claims the benefit of U.S. Provisional Patent Application No. 62/506,308, filed on May 15, 2017, each of which is entirely incorporated herein by reference.

BACKGROUND

Additive manufacturing is a process of creating three-dimensional parts by depositing overlapping layers of material under the guided control of a computer. Techniques of additive manufacturing include, without limitation, fused deposition modeling (FDM), fused filament fabrication (FFF), Plastic Jet Printing (PJP), stereolithography (SLA), selective laser sintering (SLS), selective laser melting (SLM), and material jetting (MJ). Using this technique, a material (e.g., a heated and/or pressurized thermoplastic) passes through a print head. The print head is moved in a predefined trajectory (or a tool path) as the material discharges from the print head, such that the material may be deposited in a particular pattern and shape of overlapping layers. The material, after exiting the print head, may harden.

Composite material has been used in three-dimensional (3D) printing which provides high performance designs by utilizing anisotropic stiffness, strength, thermal and electrical properties. For example, the strength in the fiber direction of a fiber composite material is much greater (perhaps ten times greater or more, in some cases) compared to the transverse direction. In this case, if the high stress directions are known from calculations (such as finite element analysis) the fiber direction can be aligned to provide a much stronger structure compared with many other materials. Similar considerations can be applied to structural stiffness, thermal conductivity, electrical conductivity, and the like. Conventional slice algorithms for filament deposition method (e.g., discontinuous fiber) may not allow detailed control of the tool path. For instance, tool path generated by the conventional slicer may not be fine controlled so as to take advantage of the preferred fiber directions. In other cases, such as continuous fiber deposition, there can be other conflicting requirements which may limit the ability to realize the analytically predicted design. Due to the complexity of geometry, it may be difficult to automate the tool path decision process. Additionally, existing methods may lack the capability for determination of complex 3D tool paths.

SUMMARY

Recognized herein are various issues with prior methods for three-dimensional (3D) printing. For example, prior methods may not be able to fully account for the actual tool path or an anisotropic nature of a printed part. In particular, prior methods may not be capable of providing fine-grained controlled 3D tool paths generation in a complex curved surface in an automated fashion.

The present disclosure provides systems and methods that may address various problems with certain existing methods for 3D printing. In some cases, such systems and methods are used for determining tool paths for printing 3D parts or objects.

In an aspect of the present disclosure, a method for generating printing instructions for printing a three-dimensional (3D) object is provided. The method comprises: (a) receiving a computer model of the 3D object in computer memory; (b) generating a parametric representation of the computer model of the 3D object; (c) selecting a first edge in a parametric representation of a curved surface of the computer model; (d) generating a 3D tool path by: (i) selecting a first set of points on the first edge; and (ii) computing coordinates of a second set of points on a second edge parallel to the first edge in the parametric representation, wherein the first edge and the second edge define the 3D tool path; and (e) generating the printing instructions for printing at least a portion of the 3D object along the tool path generated in (d).

In some embodiments, the curved surface is a three-dimensional curved surface. In some embodiments, the first edge is selected based on fiber direction. In some cases, the fiber direction is determined using finite element analysis. In some embodiments, the method further comprises using a 3D printer that uses the printing instructions to print the at least the portion of the 3D object. In some embodiments, the first edge or second edge is three-dimensional. In some embodiments, the first edge and the second edge is separated by a constant distance. In some embodiments, the 3D tool path generated in (d) has a constant width.

In some embodiments, the method further comprises generating a second 3D tool path by using the second edge in (d) as a first edge of the second 3D tool path and generating a second edge of the second 3D tool path by performing step (d). In some embodiments, the method further comprises generating one or more subsequent 3D tool paths by repeating (c) and (d) until the curved surface is filled with tool paths. In some cases, the one or more subsequent 3D tool paths have the same constant width. In some cases, one or more subsequent 3D tool paths lie on the curved surface. In some cases, at least one of the one or more subsequent 3D tool paths has an edge not parallel to an edge of another 3D tool path.

In some embodiments, the method further comprises determining a parametric point as an end of an incomplete tool path. In some cases, the parametric point defines a region wherein 3D tool path of constant width cannot fit in. In some instances, the region is filled with materials different from the materials printed along the 3D tool path generated in (d).

In some embodiments, the parametric representation of the curved surface is non-uniform rational B-spline (NURBS). In some embodiments, the method further comprises repeating (b), (c), (d) for a second curved surface of the computer model. In some cases, the second curved surface is at a constant distance from the curved surface. In some cases, the method further comprises generating 3D tool paths for one or more subsequent curved surfaces until the computer model of the 3D object is filled.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

In some embodiments, the system is provided for generating printing instructions for printing a three-dimensional (3D) object. The system comprises: computer memory that stores a computer model of the 3D object; and one or more computer processors operatively coupled to the computer memory, wherein the one or more computer processors are individually or collectively programmed to: (a) generate a parametric representation of the computer model of the 3D object; (b) select a first edge in a parametric representation of a curved surface of the computer model; (c) generate a 3D tool path by: (i) selecting a first set of points on the first edge; and (ii) computing coordinates of a second set of points on a second edge parallel to the first edge in the parametric representation, wherein the first edge and the second edge define the 3D tool path; and (d) generate the printing instructions for printing at least a portion of the 3D object along the tool path generated in (c).

In some embodiments, the system may further comprise a print head that uses the printing instructions to print the three-dimensional object. In some embodiments, the first edge is selected based on fiber direction. In some embodiments, the first edge or second edge is three-dimensional. In some embodiments, the 3D tool path in (c) has a constant width. in some embodiments, the one or more computer processors are individually or collectively programmed to repeat (b) and (c) until the curved surface is filled. In some embodiments, one or more subsequent 3D tool paths generated by repeating (b) and (c) have the same constant width. In some cases, at least one of the one or more subsequent 3D tool paths has an edge not parallel to an edge of another 3D tool path. In some cases, the one or more subsequent 3D tool paths lie on the curved surface.

In some embodiments, the parametric representation of the curved surface is non-uniform rational B-spline (NURBS). In some embodiments, the one or more computer processors are individually or collectively programmed to iteratively perform (b) and (c) for other curved surfaces of the computer model of the 3D object. In some cases, the other curved surfaces are offset by a constant distance from one another.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
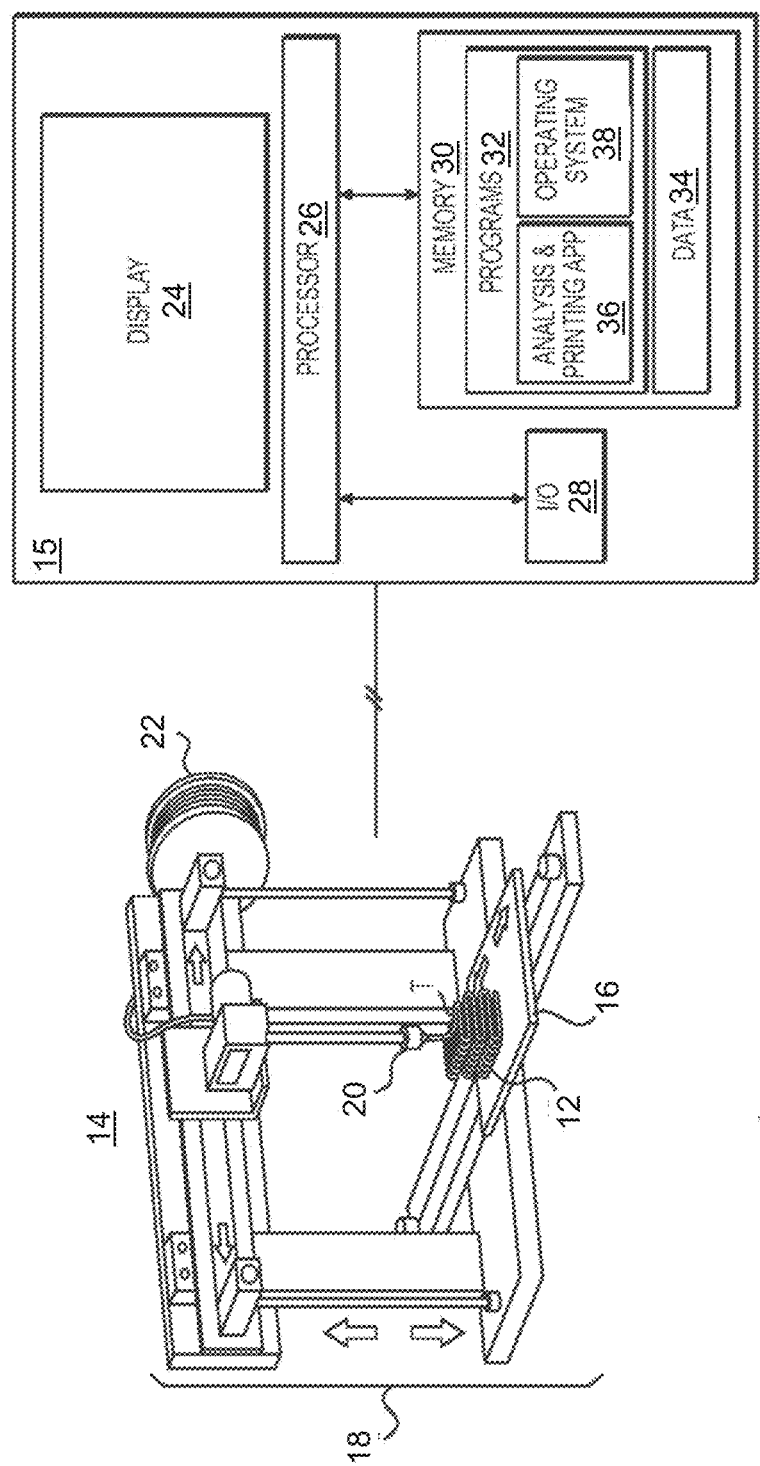
FIG. 1 illustrates an example system, which may be used to make and/or analyze a part having any desired shape, size, and structure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional printing" (also "3D printing"), as used herein, generally refers to a process or method for generating a 3D part (or object). For example, 3D printing may refer to sequential addition of material layer or joining of material layers or parts of material layers to form a three-dimensional (3D) part or structure, in a controlled manner (e.g., under automated control). In the 3D printing process, the deposited material can be fused, sintered, melted, bound or otherwise connected to form at least a part of the 3D object. Fusing the material may include melting or sintering the material. Binding can comprise chemical bonding. Chemical bonding can comprise covalent bonding. Examples of 3D printing include additive printing (e.g., layer by layer printing, or additive manufacturing). The 3D printing may further comprise subtractive printing.

The term "three-dimensional object" (3D object), as used herein, generally refers to a part that may be generated using 3D printing methods and systems of the present disclosure. The 3D object may be a portion of a larger object or an entirety of the object. The 3D object may have various form factors, as may be based on a model of such part. Such form factors may be predetermined. The 3D object may be generated in accordance with a computer model of the 3D object, such as a computer-aided design (CAD) mode.

Examples of 3D printing methodologies comprise extrusion, wire, granular, laminated, light polymerization, or power bed and inkjet head 3D printing. Extrusion 3D printing can comprise robo-casting, fused deposition modeling (FDM) or fused filament fabrication (FFF). In some cases, the 3D printing may be performed without extrusion. For example, beads may be deposited (e.g., in FFF) in a manner that does not involve extrusion. Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Power bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP) or laminated object manufacturing (LOM).

3D printing may be performed using various materials. In some examples, a material that may be used in 3D printing includes a polymeric material, elemental metal, metal alloy, a ceramic, an allotrope of elemental carbon, or a combination thereof. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The material may comprise an organic material, for example, a polymer or a resin. The material may comprise a solid or a liquid. The solid material may comprise powder material. The powder material may be coated by a coating (e.g., organic coating such as the organic material (e.g., plastic coating)). The powder material may comprise sand. The material may be in the form of a powder, wire, pellet, or bead. The material may have one or more layers. The material may comprise at least two materials.

In some cases, the material may comprise a reinforcing material (e.g., a fiber). The reinforcing material may comprise carbon fiber, Kevlar®, Twaron®, ultra-high-molecular-weight polyethylene, or glass fiber. The fiber may be continuous or discontinuous. The fiber can include one or more strands, such as one or more strands of a polymeric material. The fiber may include a plurality of strands. In some cases, the material may include matrix material, for example, a resin, a polymer, concrete, a metal slurry, and the like. The matrix material may be a singular homogenous material. As an alternative, the matrix material may be mixed with, contain, or otherwise coat one or more reinforcements (e.g., continuous or chopped fibers, such as carbon fibers, glass fibers, metallic fibers, etc.).

An object to be printed may be either scanned or created via three-dimensional rendering software. 3D printable models may be created with a computer aided design package, or via a 3D scanner, or via a plain, digital camera, and photogrammetry software. The manual modeling process of preparing geometric data for 3D computer graphics is similar to other plastic parts such as mold making and sculpting. 3D scanning is a process of analysis and collection of topographical, digital data of the surface shape and appearance of a real object. Based on this data, three-dimensional models of the scanned object can then be produced.

In some cases, regardless of the 3D modeling software used, the 3D model (e.g., in .skp, .dae, 0.3ds or some other format), needs to be converted to either an .STL or an .OBJ format, to allow the printing software to be able to read it and deposit layers according to the desired build material, desired tolerances and other aspects. STL is a file format native to the stereolithography CAD (computer-aided design) software created by the "3D Systems®" company located in the United States. This file format is supported by many other software packages; it is widely used for rapid prototyping and computer-aided manufacturing. STL files describe the surface geometry of a three dimensional object without representation of color, texture, or other common CAD model attributes. The STL format specifies both ASCII (American Standard Code for Information Interchange) and binary representations. Generally, binary files are more common, since they are usually more compact. Also, generally, each STL file describes a raw unstructured triangulated surface by the unit normal and vertices (ordered by the right-hand rule) of the triangles using a three-dimensional Cartesian coordinate system. Various other formats may be used such as Additive Manufacturing File Format (AMF), Polygon File Format (PYF) and the like.

The .STL file or the AMF file may be processed by a software stage called a "slicer." A conventional slicer may convert the model into a series of thin layers automatically. The layers are generated at the thickness appropriate for the predetermined build material and desired resolution. This produces a "G-code file" containing instructions tailored to a specific type of 3D printer. A vast majority of contemporary 3D printers execute printing commands and perform head path-planning using the numerical control programming language G-Code. Indeed, G-Code remains an industry standard for controlling automated machine tools, e.g., a 3D printer, during computer-assisted manufacturing. However, different programming techniques may be required to transform user-input parameters into printing parameters, and, moreover, into head path-planning. A G-Code may send discrete pulses to an electric motor, and thereby allows the user to control machine movement. In 3D printing, it instructs mechanical movement in the machine during the 3D printing process. Methods of the present disclosure may be used in place of or in combination with a slicer to automate a tool paths generation process or to generate tool paths in any arbitrary 3D region.

The present disclosure provides systems and methods for generating improved tool paths in an automated fashion. The tool paths may be generated to meet complex 3D geometry requirements. The tools paths can be controlled and designed with improved resolution in order to meet fine requirement, such as preferred fiber direction in three dimensions. The systems may be fully automated or semi-automated with algorithms that are configured to produce tool path commands that can be directly sent to an actuator to control the tool path. In some cases, the system may be fully automated that the tool paths in any 3D surface or 3D volume can be generated without or with reduced human intervention. For instance, predetermined rules may be loaded to the system to automate the decision making process during tool paths generation. Alternatively or additionally, the system can be semi-automated that human interaction may be allowed which can help guide the complex decision making in determining tool path(s).

Systems and methods of the present disclosure may be capable of producing tool paths in a 3D surface and/or 3D volume/region. The 3D surface may be a surface determined upon executing a computer algorithm, such as finite element analysis that may involve finite element calculations. For instance, the 3D surface may be a surface determined by stress analysis so as to improve a property or performance of the printed 3D object. As recognized herein, an advantage of printing composite material is the ability to utilize anisotropic stiffness, strength, thermal and electrical properties to produce high performance designs. For example, the strength in the fiber direction of a fiber composite material is much greater (perhaps ten times greater, in some cases) compared to the transverse direction. In this case, if the high stress directions are known from calculations (such as finite element analysis) the fiber direction can be aligned to provide a much stronger structure compared with many other materials. Similar considerations can be applied to structural stiffness, thermal conductivity, electrical conductivity, and the like. The tools paths may then be generated for the surface determined according to the complex geometric, structural, mechanical, thermal and/or electrical conductivity properties of the material and the performance of the design. Examples of methods, systems that may be used to determine preferred fiber directions, stress orientations etc are provided in PCT Patent Publication No. WO 2018/031594, which is entirely incorporated herein by reference In some cases, design requirements may be used for determining a 3D surface or a 3D layer. For instance, a part may be partitioned into a stack of 3D layers according to different physical characteristics (e.g., stress direction) that under the design requirements. Design requirements can be selected from a group that includes, for example, strength, structural deflections, stress, strain, tension, shear, load capacity, stiffness, factor-of safety, weight, strength to weight ratio, envelop geometry, minimal print time, thermal performance, thermal capacitance, thermal conductance, electrical performance, electrical capacitance, electrical inductance, electrical resistance, porosity, infill, number of shells, layer height, extruder temperature, solid density, melt density, printing speed, print head movement speed, or the material and density to direct heat through a specific area of the part and the like.

Systems and methods of the present disclosure can be applied to any 3D printing systems, structural design process, or other fabrication/manufacturing systems and methods. In some cases, 3D object may be fabricated layer-by-layer using an apparatus. The apparatus may be a 3D printer. The 3D printer may be in communication with at least one computing device. In some cases, 3D printer may be configured to create part under the guided control of computing device, for example by way of an additive manufacturing process. Tool paths may be generated for each layer for controlling the trajectory of the printer head. The layers can be any layer having arbitrary geometries. Geometrics of the layers may be determined for desired performance of the part. Although a reinforced filament fusion (RFF) process will be described below as one example of how part may be created or generated, other processes may be utilized for this purpose. Other examples of methods, systems and materials that may be used to create or generate objects or parts are described elsewhere herein.

FIG. 1 illustrates an example system 10, which may be used to make and/or analyze a part 12 having any shape, size, and/or structure. Such shape, size and/or structure may be as desired or otherwise predetermined. The system 10 may include, among other things, a printer 14 and at least one computing device 15. The at least one computing device 15 may include one or more computer processors. The printer 14 may be configured to create part 12 under the guided control of computing device 15, for example by way of an additive manufacturing process. Although a reinforced filament fusion (RFF) process will be described below as one example of how the part 12 may be created or generated, other processes may alternatively be utilized for this purpose. Examples of methods, systems and materials that may be used to create or generate objects or parts herein, including part 12, are provided in U.S. Patent Publication Nos. 2014/0232035, 2016/0176118, and U.S. patent application Ser. Nos. 14/297,185, 14/621,205, 14/623,471, 14/682,067, 14/874,963, 15/069,440, 15/072,270, 15/094,967, 15/471,786, PCT/US2017/035551, each of which is entirely incorporated herein by reference.

Printer 14 may comprise components that are controlled to create part 12 layer-by-layer using RFF technology. Specifically, printer 14 may include a support 16, a drive 18, and one or more heads 20. Each head 20 may be coupled to support 16 via drive 18. In the context of FIG. 1, drive 18 is an overhead gantry capable of moving head 20 in multiple directions during fabrication of part 12. Although drive 18 is shown as being capable of 3-axis movement, it is contemplated that any other type of drive 18 (e.g., a robotic arm, an arm/gantry combination, etc.) capable of moving head 20 in the same or a different manner may also be utilized, if desired.

Each head 20 (only one shown in FIG. 1, for clarity) may be configured to discharge at least a matrix material. For the purposes of this disclosure, a matrix material may be any material that can be discharged from head 20 and include, for example, a resin, a polymer, concrete, a metal slurry, etc. As mentioned above, the matrix material may be a singular homogenous material. As an alternative, the matrix material may be mixed with, contain, or otherwise coat one or more reinforcements (e.g., continuous or chopped fibers, such as carbon fibers, glass fibers, metallic fibers, etc.). The matrix material and the fiber(s) may be supplied to head 20 from a common source 22 (as a fiber core coated with a solid thermoplastic sleeve). As an alternative, the matrix material and fiber(s) may be provided separately. The matrix material may be supplied in a solid, plastic, or liquid state, and head 20 may be capable of liquefying (e.g., melting) the matrix material. The fiber(s) may be coated with the matrix material before and/or while passing through head 20. As the matrix-coated reinforcements(s) discharge from head 20, the matrix material may harden.

Drive 18 may move head 20 in a particular trajectory (e.g., a trajectory corresponding to an intended shape and size of part 12) at the same that the matrix-coated fiber(s) discharge from head 20, such that continuous tracks T of matrix-coated fiber(s) are formed along the trajectory. These tracks T of matrix-coated fiber(s) can be laid adjacent and/or on top of each other while the matrix is still in a liquid or semi-liquid state. The adjacent tracks T of matrix-coated fiber(s) form a connected layer, and the overlapping layers are built up to form part 12.

These tracks may form tool paths. The tracks or tool paths may lie in a 3D surface or layer. A single track may have any number of continuous fibers and/or chopped fibers coated in a matrix material M. It is contemplated that track T may have any number and lengths of fibers F (e.g., only one), and that the fibers F may be radially dispersed with the matrix M or located at a general center thereof. Alternatively or additionally, the track may not include any fibers (i.e., that includes only the matrix material M).

It has been determined that a trajectory of portions of the material that make up each of the tracks T may contribute to a characteristic (e.g., a stiffness) of part 12. For instance, the continuous fibers F or chopped fiber may contribute to the stiffness of the part. In particular, the continuous fibers F, because of the way in which they are fed through head 20 (referring to FIG. 1) and deposited within elongated tracks T, are generally aligned with the tool path of head 20. This general alignment may function to increase a stiffness of tracks T in an axial direction. In another example, although the chopped fibers may not be as aligned with the tool path of head 20 as the continuous fibers F may be (e.g., because of their shorter lengths and disconnected nature), the chopped fibers F may still align somewhat with the tool path because of the way in which the chopped fibers F are fed through head 20. The chopped fibers F may align by at least 50%, 60%, 70%, 75%, 80%, 85%, 90%, 95% or more with the tool path of the head 20. In some examples, the chopped fibers F align by as much as 75-90% with the tool path of the head 20. This general alignment, like the alignment of the continuous fiber F, may also function to increase a stiffness of tracks T in an axial direction. In another example, polymer chains PC, like the chopped fibers F, may still be caused to generally align with the tool path of head 20 during flow of the matrix M flows through head 20. This general alignment, like the alignment of the continuous fiber F and the chopped fibers F, may also function to increase a stiffness of tracks T in an axial direction. It should be noted that, the polymer chains PC may still exist and contribute to the stiffness of tracks T, along with the continuous and/or chopped fibers F.

The alignment of the continuous fibers, chopped fibers, and polymer chains, along with properties of the matrix, properties of the fiber(s), a ratio of fiber volume-to-matrix volume within each track, and the like, may have an effect on a performance (e.g., a strength, a deformation, a deflection, etc.) of part 12. Accordingly, the performance of part 12 may be selectively adjusted by adjusting the trajectory of head 20 during layer formation and/or adjusting the properties of the matrix, the properties of the fiber(s), the ratio of fiber area-to-matrix area, and the like.

The trajectory or the tool path may be applied to a 3D surface having any geometry determined above. In some instances, the tool paths have constant spacings or widths, which may conflict with other design requirements. The present disclosure provides algorithms for computing and generating optimal trajectories for a 3D surface and/or 3D volume resolving the various conflicts. The trajectories or tool path may be fine-grained controlled so as to meet the complex geometric requirement with improved performance of the 3D object.

Any number of separate computing devices 15 may be used to control the trajectory of head 20 during formation of part 12 and/or to analyze the performance characteristics of part 12 before and/or after formation. Computing device 15 may include a display 24, one or more computer processors ("processors") 26, any number of input/output ("I/O") devices 28, and one or more memories 30 for storing programs 32 and data 34. Programs 32 may include, for example, any number of analysis and/or printing apps 36 and an operating system 38.

Display 24 of computing device 15 may include a liquid crystal display (LCD), a light emitting diode (LED) screen, an organic light emitting diode (OLED) screen, and/or another display device. Display 24 may be used for display of data under the control of processor 26.

Computer processor ("processor") 26 may be a single or multi-core processor, in some cases configured with virtual processing technologies, and use logic to simultaneously execute and control any number of operations. Processor 26 may be configured to implement virtual machine or other technologies to execute, control, run, manipulate, and store any number of software modules, applications, programs, etc. In addition, in some cases, processor 26 may include one or more specialized hardware, software, and/or firmware modules (not shown) specially configured with particular circuitry, instructions, algorithms, and/or data to perform functions of the disclosed methods. It is appreciated that other types of processor arrangements may be implemented that provide for the capabilities disclosed herein.

Memory 30 can be a volatile or non-volatile, magnetic, semiconductor, tape, optical, removable, non-removable, or other type of storage device or tangible and/or non-transitory computer-readable medium that stores one or more executable programs 32, such as analysis and/or printing apps 36 and operating system 38. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

Memory 30 may store instructions that enable processor 26 to execute one or more applications, such as analysis and/or printing applications 36, operating system 38, and any other type of application or software available or executable on computer systems. Alternatively or additionally, the instructions, application programs, etc. can be stored in an internal and/or external database (e.g., a cloud storage system—not shown) that is in direct communication with computing device 15, such as one or more databases or memories accessible via one or more networks (not shown). Memory 30 can include one or more memory devices that store data and instructions usable to perform one or more features provided herein. Memory 30 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

Computing device 15 may be communicatively connected to one or more remote memory devices (e.g., remote databases—not shown) through a network. The remote memory devices can be configured to store information that computing device 15 can access and/or manage. By way of example, the remote memory devices may be document management systems, Microsoft SQL database, SharePoint databases, Oracle™ databases, Sybase™ databases, Cassandra, HBase, or other relational or non-relational databases or regular files. Systems and methods provided herein, however, are not limited to separate databases or even to the use of a database.

Programs 32 may include one or more software or firmware modules causing processor 26 to perform one or more functions disclosed herein. Moreover, processor 26 can execute one or more programs located remotely from computing device 15. For example, computing device 15 can access one or more remote programs that, when executed, perform one or more functions disclosed herein. In some cases, programs 32 stored in memory 30 and executed by processor 26 can include one or more of analysis and/or printing apps 36 and operating system 38. Analysis and/or printing apps 36 may cause processor 26 to perform one or more functions of the disclosed methods.

Operating system 38 may perform operating system functions when executed by one or more processors such as processor 26. By way of example, operating system 38 may include Microsoft Windows™, Unix™, Linux™, OSX™, and IOS™ operating systems, Android™ operating systems, or another type of operating system 38. Accordingly, disclosed embodiments can operate and function with computer systems running any type of operating system 38.

I/O devices 28 may include one or more interfaces for receiving signals or input from a user and/or printer 14, and for providing signals or output to printer 14 that allow part 12 to be printed. For example, computing device 15 can include interface components for interfacing with one or more input devices, such as one or more keyboards, mouse devices, and the like, which enable computing device 15 to receive input from a user (not shown).

Figure 2:
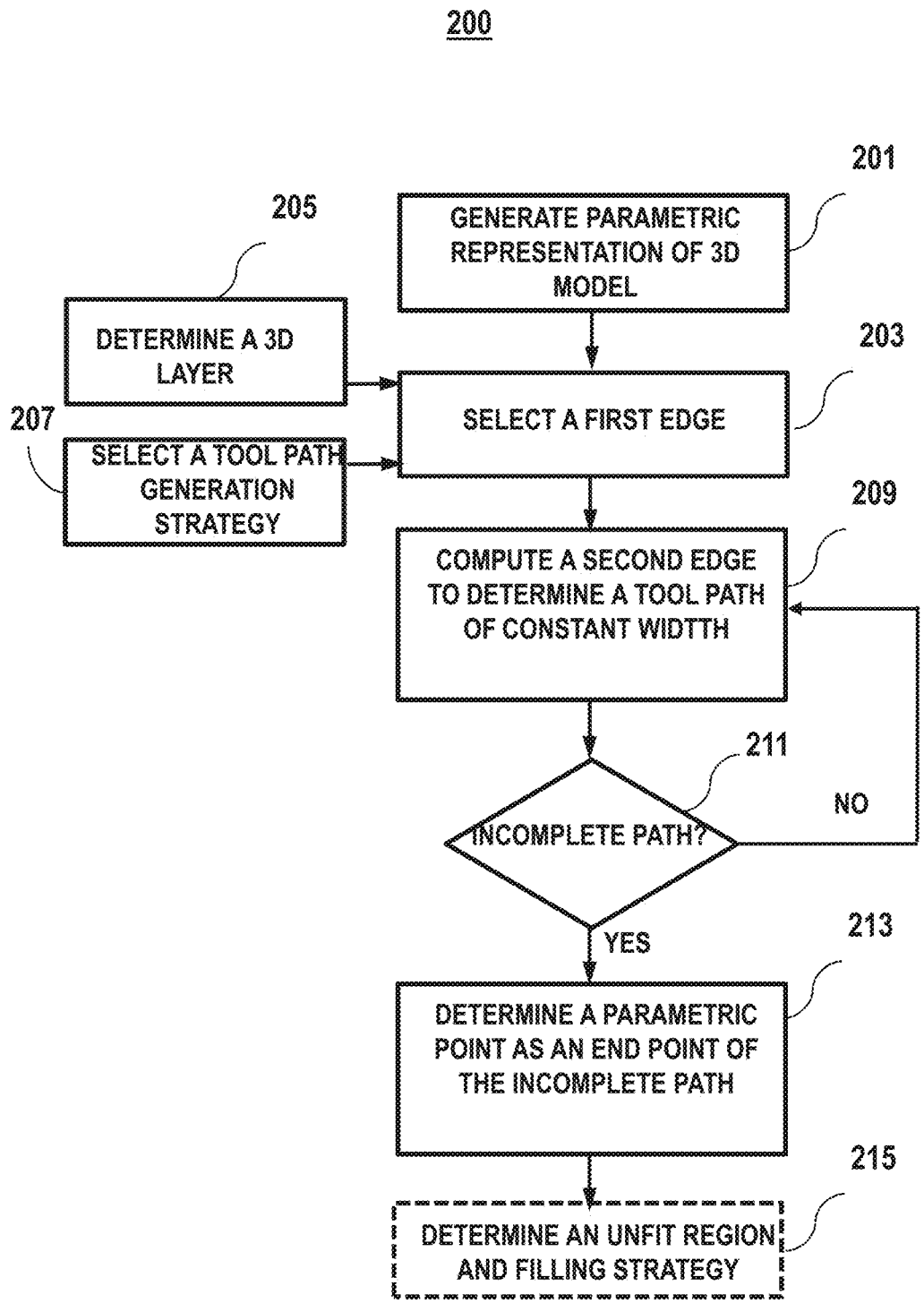
FIG. 2 is a flow chart depicting a method that may be implemented by a computing device to fabricate part via printer and/or to analyze part.

FIG. 2 is a flow chart depicting a method 200 that may be implemented by computing device 15 to fabricate part 12 via printer 14 and/or to analyze part 12. The method 200 may allow for generating tool paths in a 3D layer. The 3D layer may have complex geometries. In some cases, the 3D layer may have constant thickness. Alternatively, the 3D layer may have varied thickness. In some cases, the tool paths generated for forming the 3D layer may have constant widths within a single layer. The methods and associated algorithms may be based on parametric representation of curves, surfaces and solids. For example, the geometry representation of the tool path may be generated based on parametric representation of 3D objects.

In some instances, the method 200 may begin with generating parametric representation of a 3D model (operation 201). A 3D model of a part is received and parametric representation of the 3D model may be generated. The 3D model may comprise 3D geometric data such as point cloud data, range image, polygon soup, STL data, or other geometric data such as IGES (Initial Graphics Exchange Specification). Alternatively, the 3D model may comprise parametric representations.

The 3D model may be included in a printing job. A printing job may comprise 3D model of one or more parts. The term "part," as used herein, generally refers to an object. A part may be generated using 3D printing methods and systems of the present disclosure. A part may be a portion of a larger part or object, or an entirety of an object. A part may have various form factors, as may be based on a model of such part. Such form factors may be predetermined.

The 3D model may be the model of a part or the model a partition of a part. The partition of a part may be two dimensional or three dimensional. A partition may be from any arbitrary region or any portion of a part. In some cases, the partition of the part may be a 3D curved surface or 3D solid that can be expressed using parametric representation.

Figure 3:
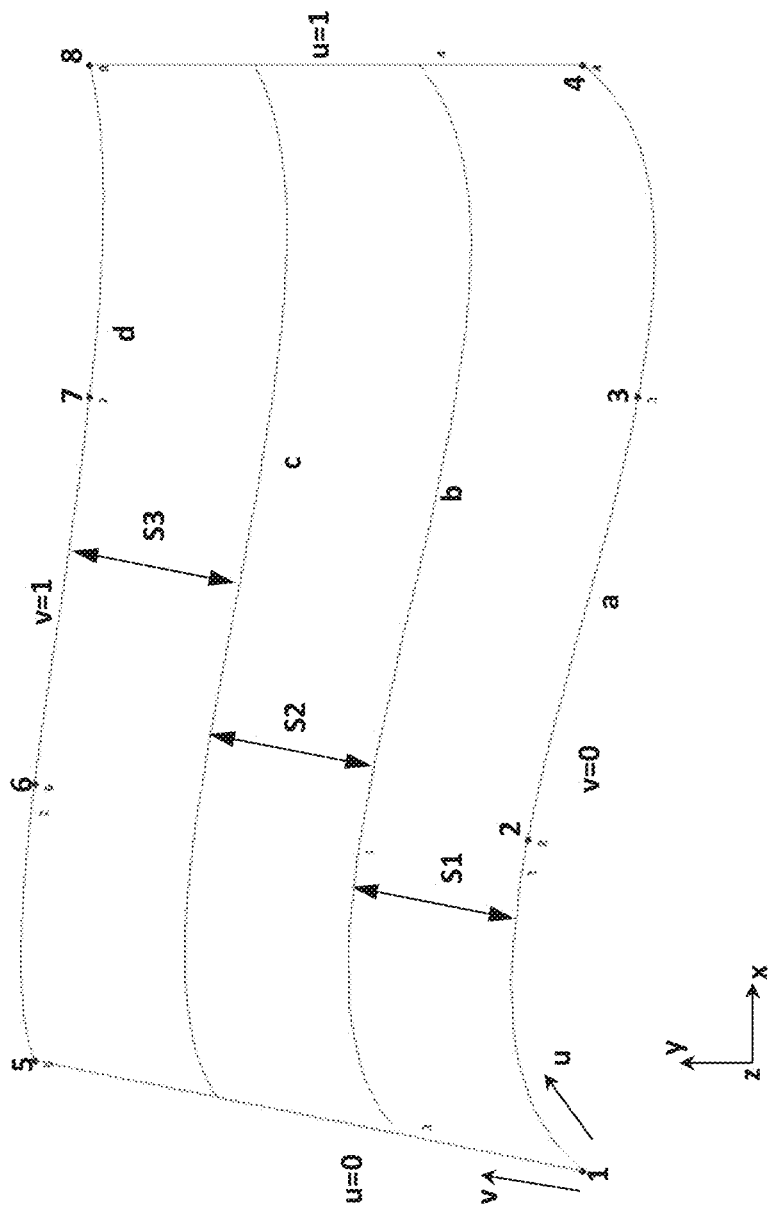
FIG. 3 shows an example of creating parametric representation of a three-dimensional (3D) surface using two parametric curves to create a "ruled surface"

Generating parametric representation of a 3D model may comprise constructing parametric representations for 3D curves, 3D surfaces and 3D solids. The parametric representation of a 3D object can be generated using any suitable methods. In some cases, parametric representation of curves may be spline, Bezier curves, b-splines or non-uniform rational b-splines (NURBS). An example of a parametric surface may include non-uniform rational B-spline (NURBS) surfaces which are useful in CAD and computer-aided-manufacture (CAM) applications. The parametric surface representation may be B-spline surface or tensor product surface. The parametric representation of 3D solids can be constructed using techniques such as extrusion, sweeping, and/or 3D tensor product solids. FIG. 3 shows an example of creating parametric representation of a 3D surface using two parametric curves to create a "ruled surface."

As shown in FIG. 3, there are two parametric directions denoted as u and v. In the illustrated example, u ranges from 0 to 1 and v ranges from 0 to 1. The parametric origin (u=v=0) is point 1. The parametric representation of a surface is given by a vector function s(u,v). The first component of s provides the physical x coordinate of a point on the surface whose parametric coordinates are u and v. The second component of s provides the physical y coordinate of a point whose parametric coordinates are u and v and similarly for the z physical coordinate. The complete physical surface in the physical x-y-z coordinate system can be expressed in terms of parametric coordinates (u,v) that range over [0,1].

$$\begin{bmatrix} x(u, v) \\ y(u, v) \\ z(u, vv) \end{bmatrix} = s(u, v)$$

For example the curve going through points (1,2,3,4), or curve "a" in FIG. 3, is obtained by setting v=0 and letting u range from 0 to 1. The curve going through points (5,6,7,8), or, curve "d", is obtained by setting v=1 and letting u range from 0 to 1. Intermediate curves shown in FIG. 3 are obtained (in this example) by setting v=⅓ (for curve "b") and v=⅔ (for curve "c") and letting u range from 0-1. Similarly, the transverse curves can be obtained in a similar manner. For a properly formed surface the iso-curves (that is holding one of the parametric variable constant and allowing the other to vary) may not intersect.

The curves (e.g., curves labeled a, b, c and d) may be used to generate the tool path for a 3D printer. The tool path for 3D printing can be curved, however, the distance between the curves is desired to be constant. For example, if the distance $s_1$ between curves "a" and "b" is approximately constant, and, similarly for $s_2$ and $s_3$ then using these curves to directly drive tool paths is feasible. A tool path with varied width may be realized to some extent. For instance, FDM printing the extrusion (or mass flow rate) of the material can be adjusted somewhat to compensate for non-constant distances between curves. However, in the case of using continuous fiber, adjusting the extrusion rate to compensate for unequal spacing of the tool path can result in fiber bunching or buckling in which case tool path of constant width is desired.

Figure 4:
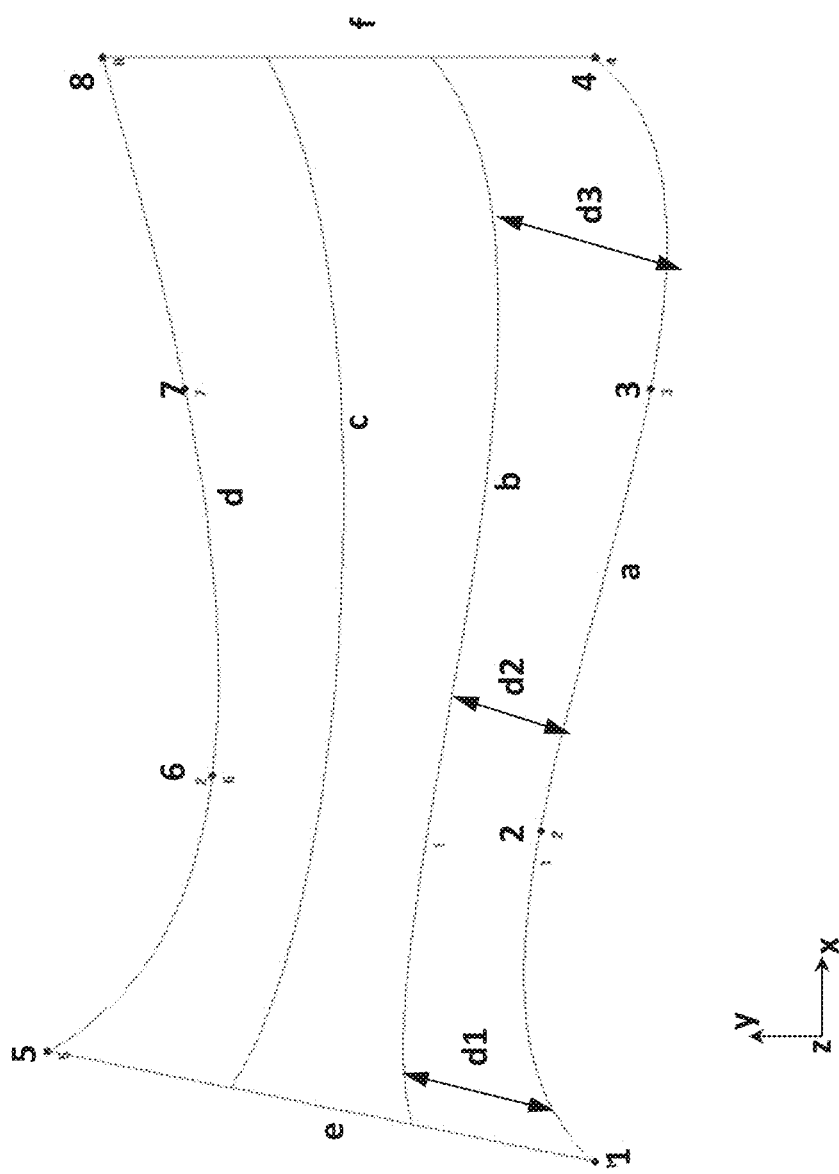
FIG. 4 illustrates a curved surface in which curves cannot be evenly spaced.

These curves can be used for controlling tool path such as defining a printing direction. In some cases, curves with constant spacing may be desired. In some situations, curves having constant spacing cannot be fit within a 3D surface. FIG. 4 illustrates a curved surface in which curves cannot be evenly spaced. For instance, distances between portions of the curves (e.g. $d_1$, $d_2$ and $d_3$) may be different. Assuming the boundary of the surface (curves "a", "d", "e" and "f") is fixed and cannot be changed, and, assuming the desired print direction is "along" curves "a" through "d," it may be difficult to achieve the unequal spacing by changing extrusion rate. The present disclosure describes tool path generation algorithm for generating 3D part in a flexible manner while leveraging the advantage of 3D printing for such parts.

Figure 5:
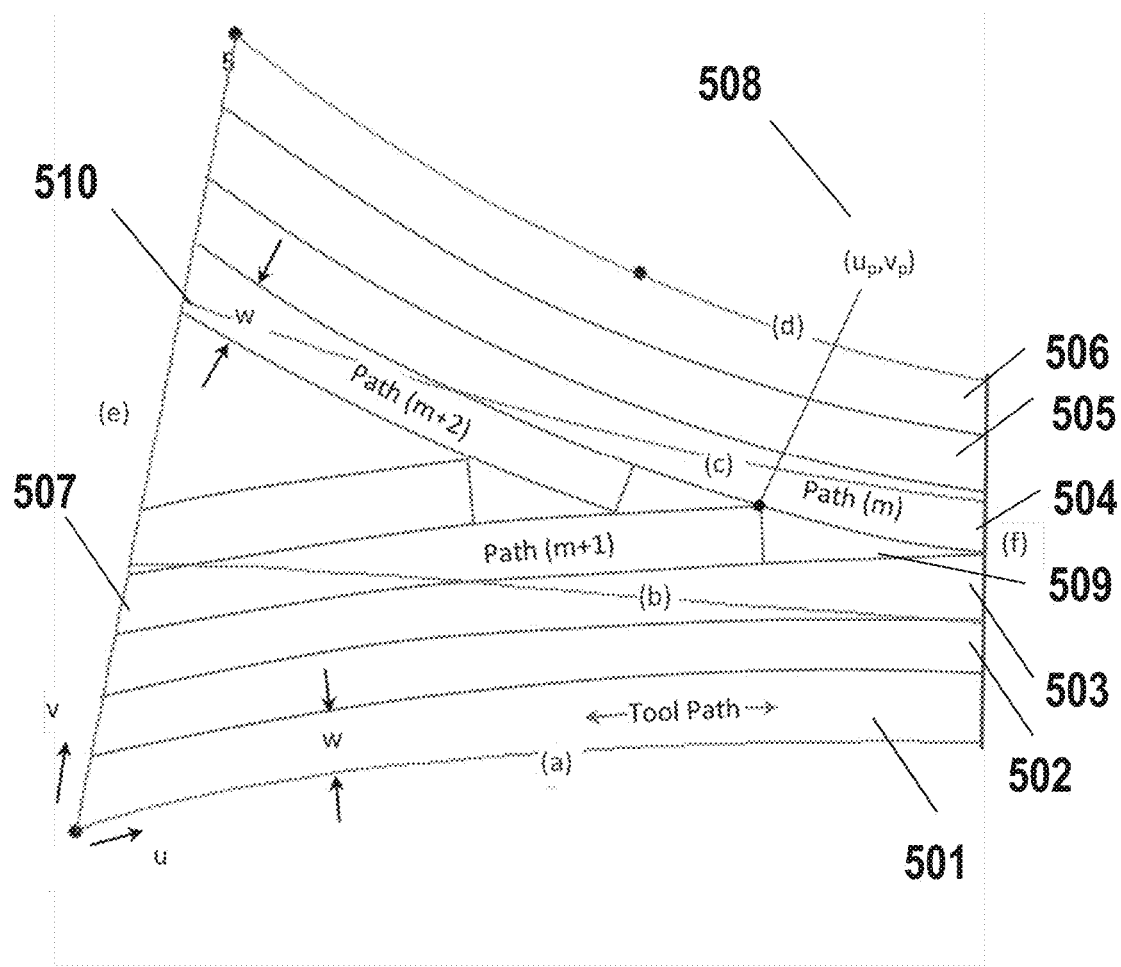
FIG. 5 illustrates an example of determining a tool path for a 3D curved surface.

The tool path generation algorithm may be an algorithm for generating tools paths of constant spacing or constant width in a 3D curved surface. FIG. 5 illustrates an example of determining a tool path for a 3D curved surface. The curved surface is displayed on a plane in FIG. 5. However, the surface may be a 3D curved surface where the z-coordinate of the points on the surface can vary. As mentioned above, a 3D curved surface can be represented using a NURBS representation. For example, using a tensor product form for the NURBS surface representation, the 3D curved surface can be represented as below:

$$s(u, v) = \sum_{i=0}^{n} \sum_{j=0}^{m} N_{i,k}(u)N_{j,l}(v)h_{ij}P_{ij} \bigg/ \sum_{i=0}^{n} \sum_{j=0}^{m} N_{i,k}(u)N_{j,l}(v)h_{ij} \quad (1)$$

In Equation (1), $N_{i,k}(u)$ is the i'th b-spline function of degree k–1, $h_{ij}$ are the associated weights and $P_{ij}$ are the control points which determine the geometry of the surface. Associated with these non-rational b-spline functions are knot vectors which together with the control points provide much flexibility in curve and surface definitions. Any surface of engineering interest can be represented using a representation similar to Eqn (1). Other parametric representation as described above can also be used to construct the curved surface. The parametric variable (u,v) in Eqn (1) vary over the range [0,1]. The curves labeled a, b, c, d correspond to v=0, ⅓, ⅔, 1 respectively while edge (e) corresponds to u=0 and edge f corresponds to u=1. The curves a, b, c, d may not be desirable for generating tool path directly as they are not evenly spaced or having constant width. In some cases, constant width paths are used for 3D printing, such as when using FDM or DED (direct energy deposition).

The provided tool generation algorithm is provided for generating a 3D tool path on a curved surface. Tool paths with constant width lie on the surface s(u,v). The tool paths generated by the algorithm may be continuous and complete in at least a region of the surface. The provided algorithm is also capable of generating incomplete tool paths in a region where complete tool paths do not fit.

FIG. 5 shows an example of generating tool path in a curved surface. In some cases, a tool path may comprise two parallel edges separated by width (w) and at least one of the two edges may be computed using the provided algorithm. The tool paths generation process may begin with selecting a starting edge as the first edge of a first tool path. In the illustrated example, edge (a) is selected as a starting edge. The starting edge can be an edge of the curved surface. The starting edge can be determined using finite element analysis. For instance, the starting edge may be aligned with a preferred direction determined based on displacement, stress, stiffness, and strain measurements of the model.

Upon selection of the first edge, a predetermined number of points $(u_{00},v_{00})$, $(u_{10},v_{10})$, . . . , $(u_{n0},v_{n0})$ may be selected along the first edge. For example, for edge (a), points $(u_{00},v_{00})=(0,0)$, $(u_{10},v_{10})=(0.1,0)$ . . . $(u_{n0},v_{n0})=(1,0)$ may be selected providing n+1=11 points. These parametric points lie on the edge of the curve. Any number of points may be selected. These points may or may not be evenly spaced. For instance, points with smaller spacing may be selected in a segment of the edge with greater curvature. Alternatively, the number of points can be evenly distributed regardless of the shape of geometry of the edge. In some cases, the number of points may be pre-determined. In some cases, the spacing of the points may be pre-determined. In some cases, the number and/or distribution of the points may be determined based on pre-determined rules.

Figure 6:
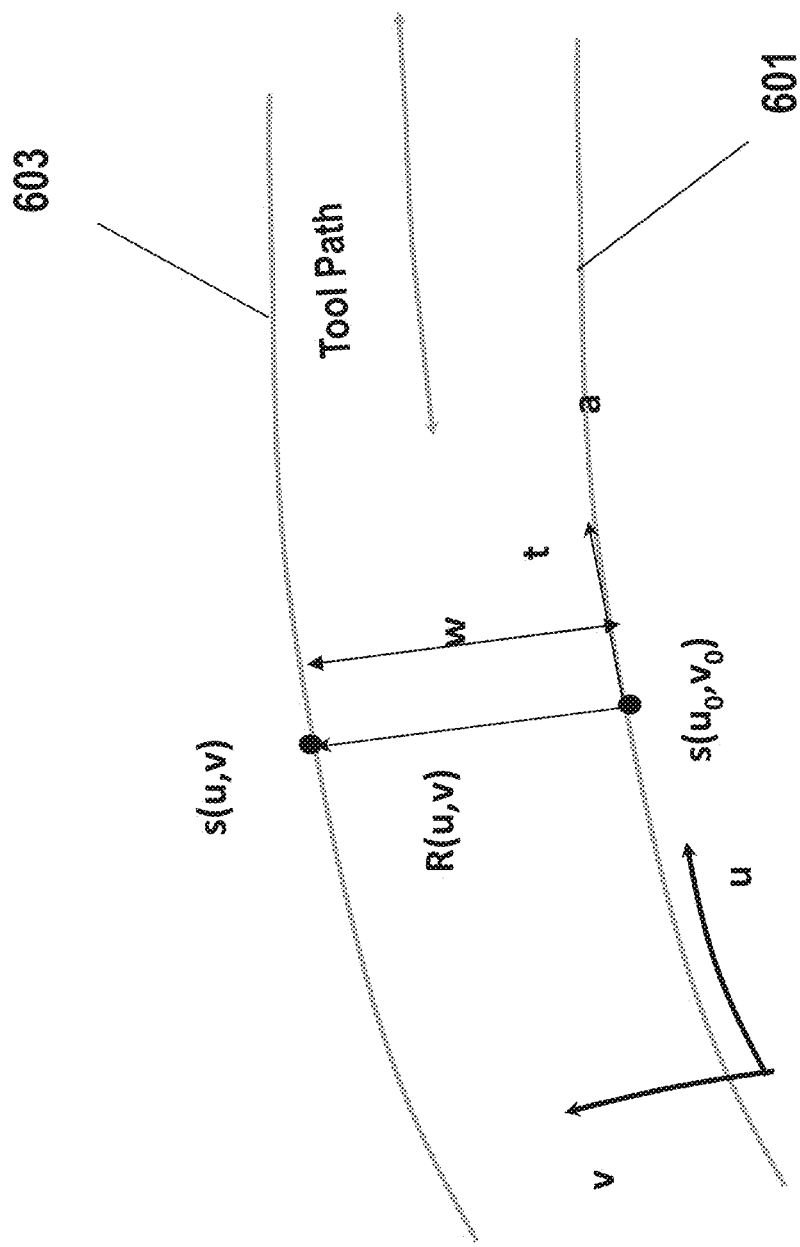
FIG. 6 illustrates an example of computing a second edge parallel to a first edge of a tool path.

A second edge parallel to the first edge may be computed. In some cases, the second edge may be desired to be parallel to the first edge such that a single tool path has a constant width. A second set of parametric points $(u_{01},v_{01})$, $(u_{11},v_{11})$, . . . , $(u_{n1},v_{n1})$, on the opposite parallel edge (i.e., second edge) of the tool path may be generated, such that the straight line distance between the opposite points and the corresponding base points $(u_{00},v_{00})$, $(u_{10},v_{10})$ . . . , $(u_{n0}, v_{n0})$ is equal to the constant width w. FIG. 6 illustrates an example of computing a second edge 603 parallel to the first edge 601 and the distance between the two edges 601, 603 is equal to the constant width w. It is assumed that the distance on the curved surface is equal to the straight line distance between two opposite points. This is an accurate assumption for small line widths w which are typical in 3D printing technology. By selecting the second set of points on the opposing edge, the second set of points (e.g., $(u_{01},v_{01})$, $(u_{11},v_{11})$, . . . ) also lie on the curved surface. This may prevent deviation of the newly generated edge locations (versus desired physical locations) as the number of tool paths is increased. FIG. 6 shows two points on opposite edges 601, 603 of a tool path. Each edge of the tool path is defined by (n+1) points. The set of parametric points (u,v) on the second edge (e.g., edge 603) can be computed such that $$R \cdot R = w^2 \text{ and } R \cdot t = 0 \quad (2)$$

where $R(u,v) = s(u,v) - s(u_0,v_0)$ where s(u,v) is the 3D surface definition, given for example by Eqn (1), and t is the edge tangent vector which can be computed from the specified surface by $$t = \left(\frac{\partial s(u, v)}{\partial u}\right) \left|\frac{\partial s(u, v)}{\partial u}\right|^{-1} \bigg|_{u_0,v_0}$$

The first of Eqn (2) guarantees that the path width (at $u_0,v_0$) is given by w, and, the second of Eqn (2) guarantees that the distance is measured perpendicular to edge (a). Eqn (2) constitutes two equations for the two unknown parametric coordinates (u,v). Once the two parametric values (u,v) are determined they are stored as one of the points on the new edge. The process is then repeated for all of the other predetermined points along edge (a) thus creating a new array of parametric points $(u_{01},v_{01})$, $(u_{11},v_{11})$, $(u_{n1},v_{n1})$ for the second edge 603. This array of n+1 points can then be used to create a B-spline curve to represent the parametric points on the second edge of the tool path, that is $$c(t) = \frac{\sum_{i=0}^{n} h_i P'_i N_{i,k}(t)}{\sum_{i=0}^{n} h_i N_{i,k}(t)} \text{ where } c(t) = \begin{bmatrix} u(t) \\ v(t) \end{bmatrix} \quad (3)$$

Where the P' are control points (in parametric space) and t is a new parametric variable (that ranges from t=0 to t=1) used to interpolate new values of the surface parametric variables u,v. Note that all of the computed physical points are guaranteed to lie on the surface s(u,v). The width w of the resulting path may be exactly determined at the points where Eqn (2) are solved. In between these locations the actual width may deviate somewhat from the desired width w, however, this deviation can be controlled to any desired accuracy by choosing a sufficient number of (n+1) points. In some cases, the number of points required to maintain the required accuracy may be at least 5, 10, 20, 30, 40, 50, 60, 70, 80, 90, 100, 150, 200 or more for each tool path. The inaccuracy for a given tool path may not build up for subsequent tool paths as the widths are re-enforced for each subsequent tool path edge and the points may always lie on the specified surface s(u,v).

In some cases, a solution to Eqn (2) may not exist. In this case, if a complete tool path can be inserted (e.g. Path m 504 of FIG. 5) and a solution to Eqn (2) does not exist (this may occur near the end points, u=0 or u=1), such points whose coordinates cannot be computed may not be included in the curve fit of Eqn (3). The parametric values oft where u=0 (or u=1) can be computed by extrapolation from the parametric description of Eqn (3). In some cases, a complete tool path may not be inserted or exist (e.g. Path m+1 507 of FIG. 5) in which case an algorithm for generating incomplete path is provided and is described later herein.

It should be noted that the same approach can also be used to generate a tool path of varied width if desired. For instance width w may be variable and the coordinates of the second set of points can be computed accordingly. The second edge or the opposing edge of a tool path may be computed such that the width of the tool path can be controlled in high precision.

Referring back to FIG. 5, subsequent paths can be generated using the same approach. The second edge of the previous adjoining tool path can be used as the first edge of the subsequent tool path. In some cases, the same process may be repeated until a selected region is filled with tool paths. In some cases, all the tool paths may have the same width in a continuous region. For instance, tool path 501 and tool path 503 may have the same width w. In alternative cases, tool paths of different width may be generated in a continuous region. For instance, tool path 501 and tool path 505 may have different widths. The width of a single tool path or the widths of multiple paths can be controlled at different level. For instance, the width of a tool path may be constant or variable according to a pre-determined function, and the width of a tool path may or may not be the same to the width of other paths in a curved surface.

In some embodiments, a curved surface or a selected region may be filled with tool paths according to a tool path generation strategy. The tool path generation strategy may determine the order of tool paths generated, the number and/or width of tool paths in a selected layer/surface, the starting edge in a selected surface or layer, or the number and/or width of tool paths in different layers and the like. In some cases, a given tool path generation strategy may determine how subsequent tool paths are generated or how a first edge of a tool path is selected. In the example illustrated in FIG. 5, a given tool path generation strategy may determine that a number of tool paths (e.g., tool path 501, 502, 503) parallel to edge (a) are generated first, then a number of tool paths (e.g., tool path 504, 505, 506) parallel to edge (d) are generated to fill the surface/region. In a different tool path generation strategy, all the tool paths may be generated sequentially to be parallel to edge (a). In another example, the tool path generation strategy may be different across different layers or surfaces so that appropriate overlapping of the intersection regions may occur. In another example, the tool path generation strategy may determine the precision of how a single tool path can be controlled such as by controlling the number of points and/or distribution of points lie on an edge. Such tool path generation strategy may be pre-determined by the system or defined by a user. The tool path generation strategy may be automatically selected for a given layer/surface. The tool path generation strategy can be adjusted or modified manually by a user such as via a user interface.

The aforementioned incomplete tool paths may be generated in a region where a complete tool path cannot fit. As shown in FIG. 5, a complete, continuous tool path cannot be generated across a region defined by path m 504 and tool path 503. An algorithm for generating incomplete tool path in an unfit region is provided by the present disclosure.

The algorithm may be configured to first determine a complete tool path cannot be generated thus an incomplete tool path is to be generated. In some cases, this may be determined by checking whether a point lies on a second edge of a tool path also lies inside a previously generated tool path. For example, when the solution of Eqn (2) shows that the solution for (u,v) lies inside a previously generated tool path, it indicates that a new complete and continuous tool path that spans the complete parametric coordinate ([0 to 1] in FIG. 5) is not possible.

When a complete tool path is determined to not exist or an incomplete tool path is to be generated, a parametric point defining the end of the incomplete tool path may be determined. As shown in FIG. 5, point $(u_p, v_p)$ 508 is the parametric point defining the end of the incomplete tool path m+1 507. The parametric point can be determined by: (i) finding the current unacceptable parametric point (from the maximum possible n+1 points previously described) where a solution to Eqn (2) is not possible; and (ii) given the last acceptable parametric point and the current unacceptable parametric point, searching for the parametric point in-between these two points where a normal vector R can be constructed and just fit in. The normal vector R can be constructed and determined using the method described in FIG. 6. The parametric point 508 is then used as an end of the incomplete and continuous path 507.

The parametric point can also be used to determine an unfit region 509. The unfit region 509 may be a region where a complete tool path of width w cannot fit. The unfit region may be filled according to a predetermined filling strategy. For instance, the materials and filling process in the unfit region may or may not be different from other regions. In some cases, the unfit region may be filled with materials different from materials used for the region filled with complete tool paths. For instance, the unfit region may be filled with chopped or neat matrix material. In some cases, the unfit region may be void region. Alternatively, the unfit region can be filled with the same material but in a separate process. The unfit region may be filled according to the requirement of the part. The same strategy can be applied to Path (m+2) and repeated until the entire unfit region is filled. The algorithm for generating incomplete tool paths can be applied to any region where a complete and continuous tool path of constant width does not fit in.

Referring back to FIG. 2, the method 200 may utilize the aforementioned algorithms to generate tool paths in a complex, 3D surface or layer. In some cases, tool paths of constant with may be generated for a selected 3D layer. A 3D layer may be determined (operation 205). In some cases, the 3D layer may have complex 3D geometries in order to provide improved design performance as described above. In some cases, the 3D layer may be determined according to finite element analysis. It should be noted that the 3D layer can be any arbitrary curved surface.

Figure 7:
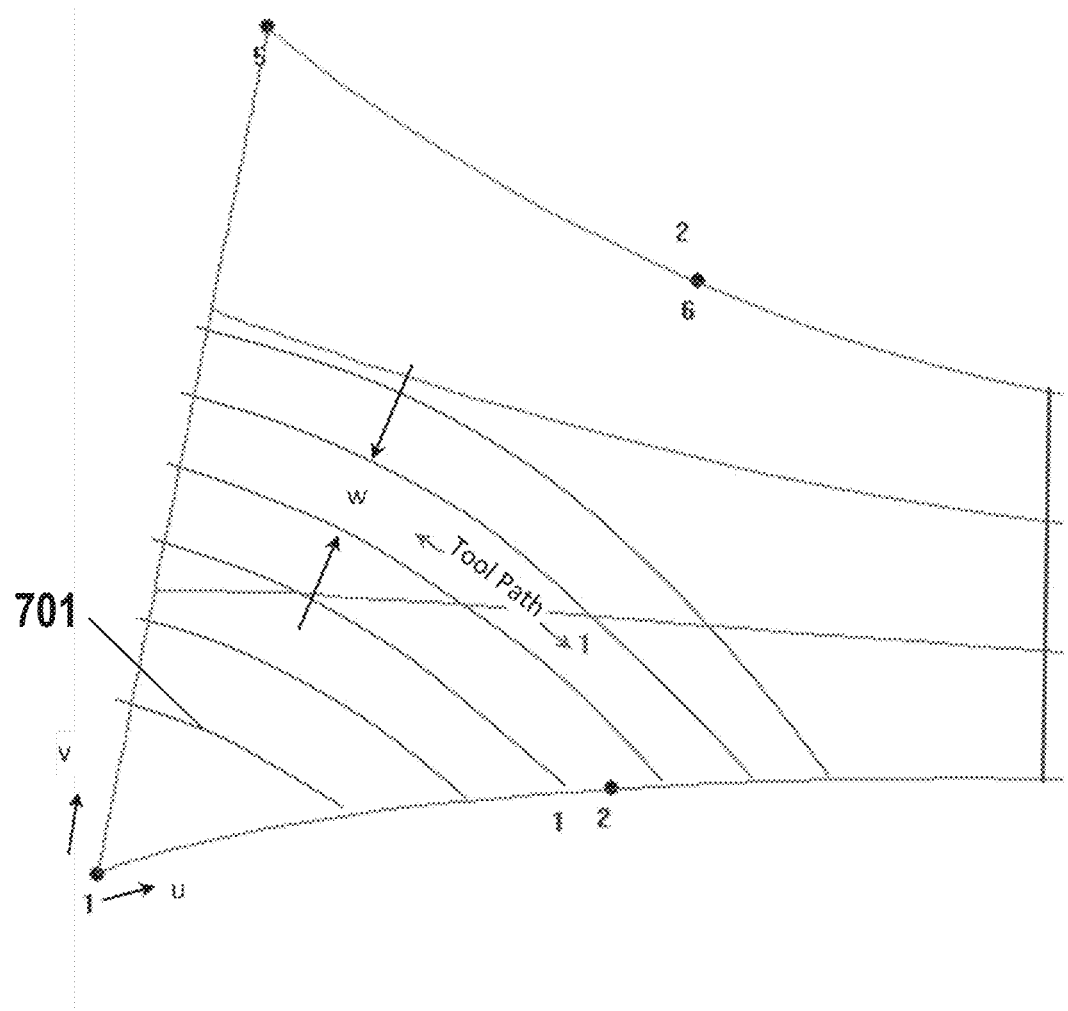
FIG. 7 shows an example of a starting edge which is not parallel to any edge of the curved surface.

The process may proceed with selecting a first edge (operation 203). The first edge or starting edge (if the first tool path of the layer) may be a curved edge. The starting edge may be selected according to a tool path generation strategy as described above. In some cases, the tool path generation strategy may determine which edge is the starting edge of the entire layer or the first edge of a tool path. The starting edge may or may not be a geometric edge of the curved surface. The starting edge can have any direction or geometry. FIG. 7 shows an example of a starting edge 701 not parallel to any geometric edge of the curved surface. In some cases, the starting edge may be determined using finite element analysis. For instance, the starting edge may be aligned with a preferred direction determined based on displacement, stress, stiffness, and strain measurements of the model. In some cases, the starting edge may be aligned with the preferred fiber direction.

The tool path generation strategy may be automatically selected (operation 207) from a library of tool path generation strategies. Alternatively or additionally, the tool path generation strategy may be pre-determined and/or manually selected by a user. In some cases, the starting edge may be selected according to a preferred fiber direction which is calculated using finite element analysis.

A tool path may be generated by computing a second edge parallel to the first edge (operation 209) such that the tool path may have a constant width. The tool path may be complete and continuous across the 3D layer and the tool path can be generated using the algorithm described with respect to FIG. 5 and FIG. 6. In the case when a complete tool path cannot fit in a region, incomplete tool paths may be generated (operation 213). The aforementioned algorithm can be used to determine whether an incomplete path is needed. For instance, when a point on a second edge of a tool path is determined to be inside a previously generated tool path, the process may proceed to step 213. The algorithm for generating incomplete tool as described in FIG. 5 may be used (operation 211). Operations 203, 209, 211, 213 may be repeated until the entire layer or surface is filled. In some cases, the parametric point may be used to determine an unfit region and upon determining an unfit region, a filling strategy may be selected for filling the unfit region. In some cases, the filling strategy applied to the unfit region may be different from the strategies applied to other regions.

Although FIG. 2 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, in some cases the parametric representation may be readily available in the received 3D model. In some cases, the subsequent tool paths may use the second edge of the previous tool path as the first edge by default such that only the starting edge of the first path needs to be selected. Alternatively, the first edge for each subsequent tool path may be selected individually. The method may also be modified in accordance with other aspects of the disclosure as provided herein.

The method of FIG. 2 can be implemented in hardware components, software component or combinations of hardware and software. For example, the method can be implemented by one or more processors that can be a single or multiple microprocessors, field programmable gate arrays (FPGAs), ASICs, special purpose computers, general purpose unit, graphic processing unit (GPU) or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

Figure 8:
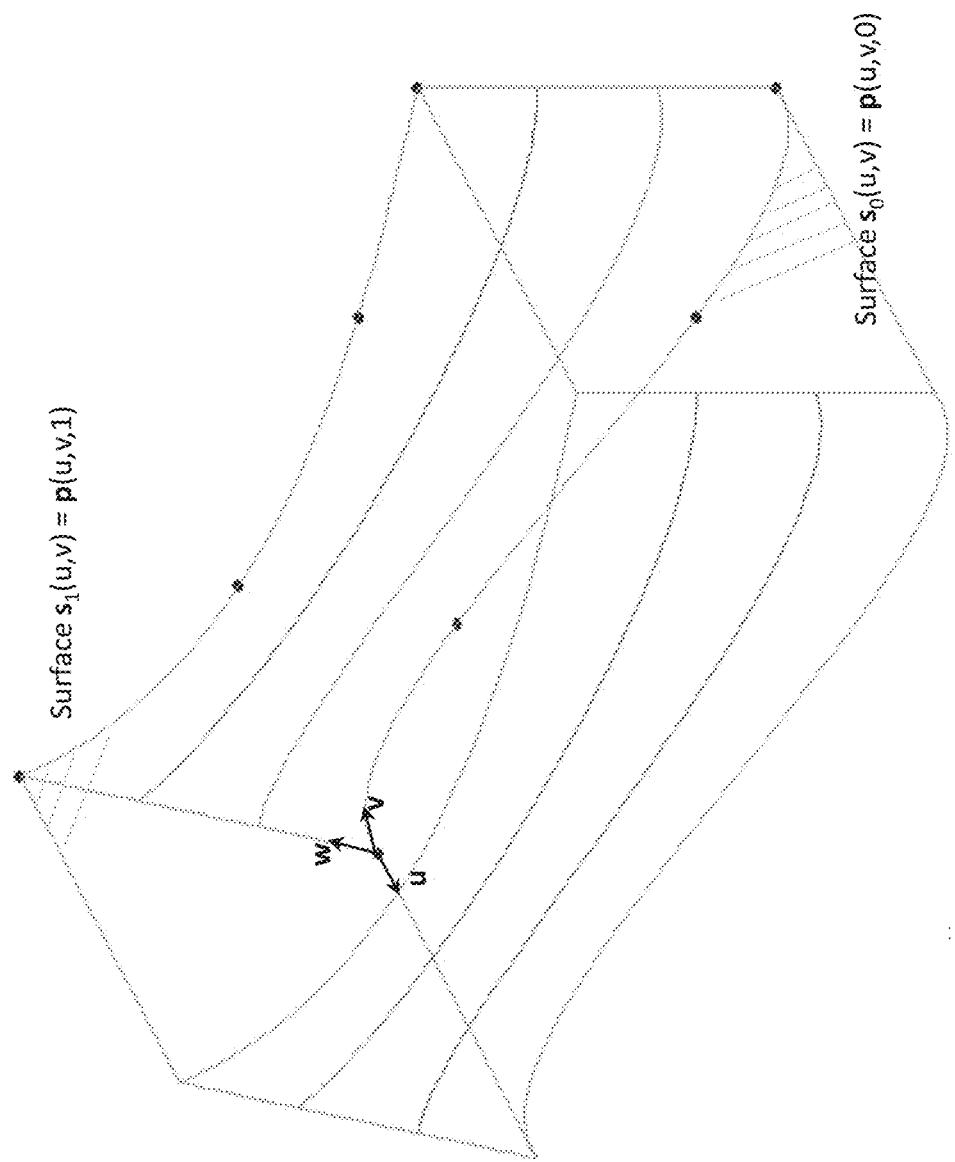
FIG. 8 and FIG. 9 illustrate examples of generating tool paths in a 3D solid region.
Figure 9:
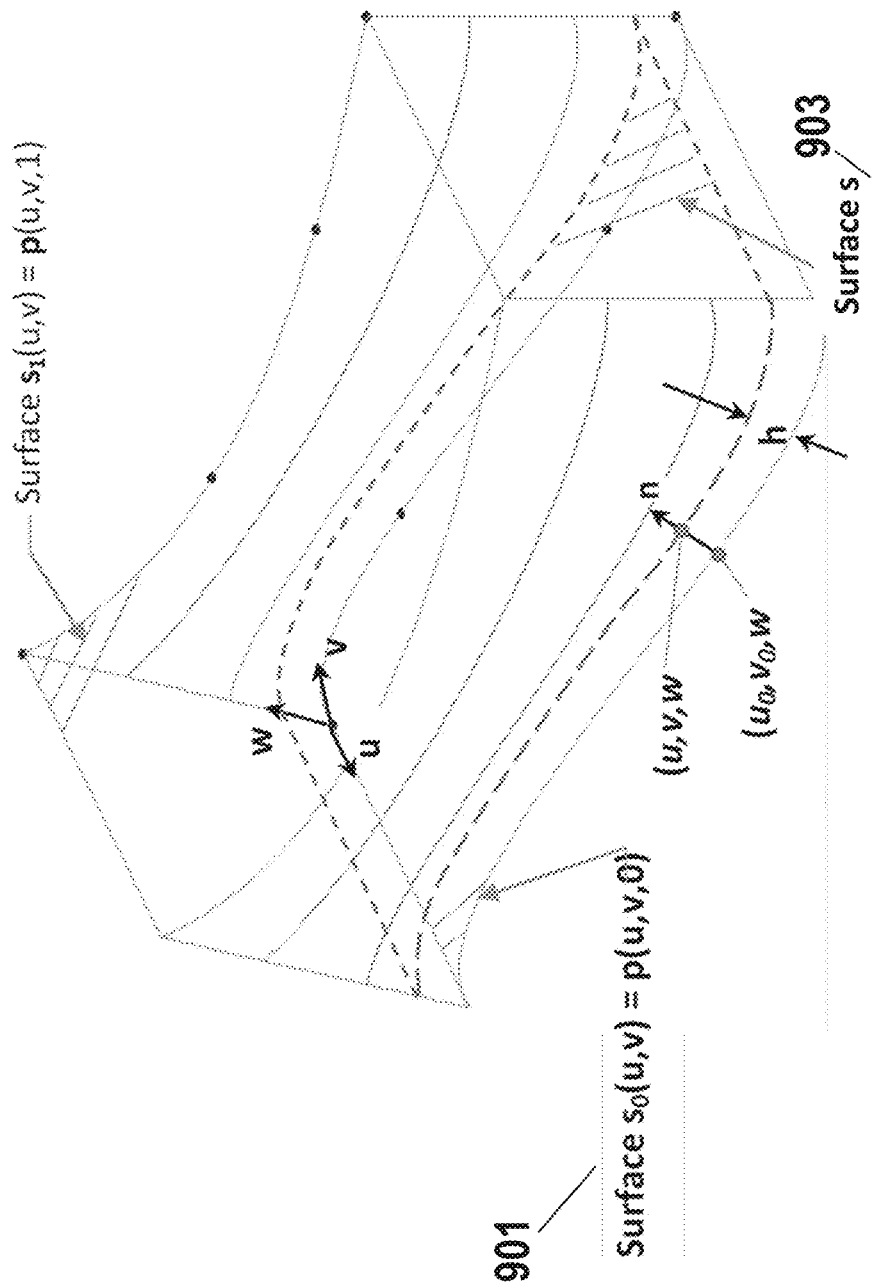

The present disclosure also provides methods for generating tool paths for 3D solid regions. The method may be similar to the method for generating tool paths for a curved surface. FIG. 8 and FIG. 9 illustrate examples of generating tool paths in a 3D solid region. The 3D solid region may be partitioned into stack of layers. In some cases, the stack of layers may be preferred to have constant thickness. In some cases, for each layer, tool paths may be generated using the aforementioned methods. Solid 3D regions can be represented parametrically similar to the 3D surface as illustrated in FIG. 3. Various other methods can be used to construct the parametric representation of the 3D solid. The parametric representation of 3D solids can be constructed using techniques such as extrusion, sweeping, and/or 3D tensor product solids. Using a NURBS representation for the 3D solid, a 3D solid can be expressed in the form $$p(u,v,w) = \sum_{p=0}^{q}\sum_{i=0}^{n}\sum_{j=0}^{m} N_{i,k}(u)N_{j,l}(v) \quad (4)$$

$$N_{p,r}(w)h_{ijp}P_{ijp} \Big/ \sum_{p=0}^{q}\sum_{i=0}^{n}\sum_{j=0}^{m} N_{i,k}(u)N_{j,l}(v)N_{p,r}(w)h_{ijp}$$

The 3D solid in this case is constructed as a tensor product of a parametric curve in the parametric w direction and a surface defined in the parametric (u,v) directions. For example the w=0 parametric surface is obtained from Eqn (4) by letting w=0 and is illustrated in FIG. 8. Since the w=0 plane is a surface with the representation $s(u,v)=p(u,v,0)$, the same algorithms and method as described in FIG. 3-FIG. 6 can be used to generate the tool path for the surface corresponding to w=0. The same algorithms and method as described above can be used to generate the tool paths for any curved surface (e.g., surface corresponding to w=1).

In some cases, a layer (for example corresponding to the surface w=0) may be desired to have constant thickness for 3D printing using FDM or other technologies. However, it may be difficult to fit layers of constant thickness in any arbitrary 3D solids. The present disclosure provides methods and algorithms to generate layers of constant thickness using approach similar to the 3D surface case as illustrated in FIG. 5. The difference is that, in this case instead of generating a parametric curve (c(t) given by Eqn 3, which gives the parametric coordinates of a second edge offset relative to a first/starting edge), a second surface from the solid definition is generated. The second surface may be generated such that it is offset from the first surface of the layer by a constant distance. The second surface s of a layer may be defined from the requirements that it is offset by a constant distance (e.g., physical distance h) from a first surface of the layer (e.g., starting surface ($s_0$)) as illustrated in FIG. 9.

As shown in FIG. 9, a starting/first surface (e.g. $s_0(u,v)$ 901) may be selected. The second surface s 903 of the layer is to be generated such that it is a constant thickness h normal to the surface $s_0(u,v)$. A first tool path on the starting/first surface $s_0(u,v)$ may be generated using method described in FIG. 2. This tool path may be defined in terms of a number of spline curves c(t) which define the values of (u,v) which in turn are used in the surface definition to generate edges of the different tool paths. For a given curve c(t) that defines a given edge of the tool path in surface $s_0$, (n+1) parametric points (e.g. $(u_{01},v_{01})$, $(u_{11},v_{11})$, . . . , $(u_{n1},v_{n1})$) may be computed. Each of these points may lie on the surface $s_0(u,v)$ within any desired accuracy. Such accuracy may be determined by constant width w. For instance, smaller width w leads to higher accuracy. For each of these points, for example ($u_0,v_0$), the normal to the surface $s_0(u,v)$ can be computed using $$n = \left[\frac{\partial s_0(u, v)}{\partial u} \times \frac{\partial s_0(u, v)}{\partial v}\right] \left|\frac{\partial s_0(u, v)}{\partial u} \times \frac{\partial s_0(u, v)}{\partial v}\right|^{-1}\bigg|_{u_0,v_0}$$

The values for the new parametric point on the second layer surface is determined using the equations:

$$R \cdot R = h^2 \text{ and } \frac{R}{|R|} \cdot n = 1 \quad (5)$$

where $R(u, v, w) = p(u, v, w) - s_0(u_0, v_0, w_0)$

The requirements of Eqn (5) defines a unique point in parametric space (u,v,w) whose physical location lies a distance h from the physical location of parametric point ($u_0$, $v_0$, $w_0$) and is perpendicular to the starting surface $s_0$. Other methods such as iterative search can also be used to find the parametric coordinates of this point subject to the appropriate constraints (for example $w_0 < w < 1$). This process can be repeated for all points extracted from the tool path curves previously constructed on surface $s_0$. Alternatively or additionally, additional one or more sets of parametric coordinates on $s_0$ can be used. Note that the surface $s_0$ in Eqn (5) has the argument $w_0$. For the starting surface $w_0=0$ (the top surface of the solid can also be used as the starting surface thus $w_0=1$), subsequent starting/first surfaces may be functions of (u,v,w) where w is interpolated using a parametric representation for a surface in parametric space. Each subsequently generated surface may be defined by two new parametric variables, (r,t) that range from 0 to 1. The (r,t) parametric points may provide the (u,v,w) parametric points whose physical locations lie on the new surface within any desired accuracy. The second surface whose distance from the first surface is a constant thickness h in the normal direction is then defined. This surface definition can in-turn be used to generate tool paths on this arbitrary curved surface using the methods previously described. This is analogous to how the c(t) function is defined for generating tool path edges (see Eqn 3). The parametric surface describing the parametric coordinates is defined as $$\begin{bmatrix} u(r, t) \\ v(r, t) \\ w(r, t) \end{bmatrix} = \sum_{i=0}^{n} \sum_{j=0}^{m} N_{i,k}(r) N_{j,l}(t) h_{ij} P'_{ij} \bigg/ \sum_{i=0}^{n} \sum_{j=0}^{m} N_{i,k}(r) N_{j,l}(t) h_{ij} \quad (6)$$

The parametric coordinates (r,t) are then used in place of (u,v) for the parametric coordinates for the surface definition. The $P'$ are control points (for the parametric locations (u,v,w)) that are chosen so as to create a surface in terms of (r,t) which interpolates the parametric coordinates of the points on the next layer that satisfy Eqn (5). The physical locations of points on the new surface can be obtained from the solid definition using $$s(r,t) = p(u(r,t), v(r,t), w(r,t)) \quad (7)$$

here p(u,v,w) is given by Eqn (4) and (u,v,w) as a function of r, and t is given by Eqn (6). Using Eqn (7) as the new definition of the surface, the same algorithm described above for creating tool paths on an arbitrary curved surface can be applied to the curved surface defined by Eqn (7). Again the values of (u,v,w) used to create the parametric surface in Eqn (6) may be determined using the requirements imposed by Eqn (5). The points defined by Eqn (7) may lie on surfaces that are in the solid p(u,v,w) and the layers are of constant thickness h within a desired accuracy.

Generation of each surface and layer may be repeated as needed. Similarly, tool path generation strategies may be selected for generating tool paths in 3D solids. The tool path generation strategy may determine, for example, the order of generating different layers. For example, a first the layer that starts at $s_0$ may be generated, where the first layer has a second surface above $s_0$. Next, a subsequent layer under surface $s_1$ may be generated in a direction normal to $s_0$. This may be helpful to ensure that on these two surfaces $s_0$ and $s_1$ there are be no "jagged" regions caused by the inability to deposit a complete layer of thickness h.

There may be unfit region where a complete layer of constant thickness cannot fit in. In this case, the similar approach for determining incomplete tool paths as described in FIG. 2 may be applied. The approach may be configured for staggering tool paths in the thickness (h) direction as opposed to the tool path width (w) direction in the single surface situation. The unfit region can be determined and filled using similar method as described elsewhere herein.

Figure 10:
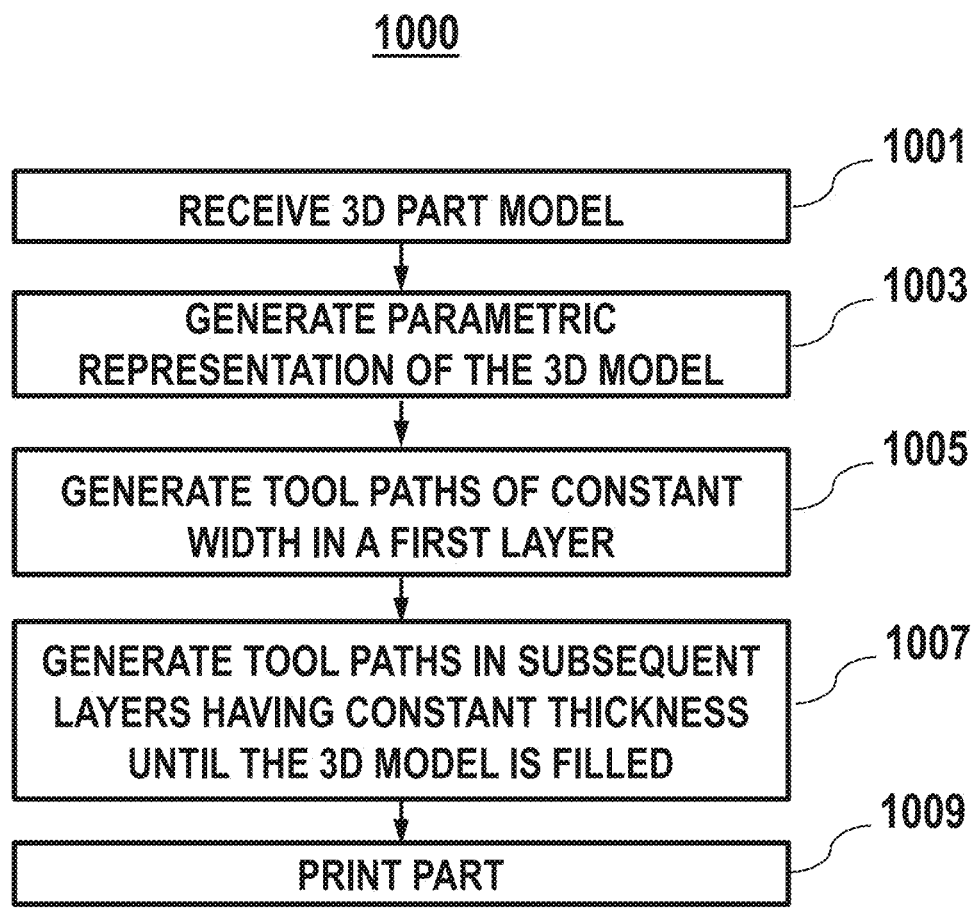
FIG. 10 shows a method of generating tool paths for a 3D solid region, in accordance with embodiments of the invention.

FIG. 10 shows a method 1000 of generating tool paths for a 3D solid region, in accordance with embodiments of the invention. The process may be fully automated without user input. Alternatively, the process may be semi-automated where user may provide input via a user interface to guide the tool path generation process. One or more parameters can be modified or specified by a user at different operations.

The process 1000 may begin with receiving a 3D part model (operation 1001). In some cases, the 3D model may be partitioned into multiple layers. In some cases, a layer may be a curved layer or curved surface. The layer may be preferred to have constant thickness. It should be noted that the same approach can also be used to generate tool paths if a layer of varied thickness if desired. The 3D model may be automatically partitioned according to pre-determined rules. In some cases, a user may be allowed to specify a rule for partitioning the part. Alternatively or additionally, the 3D model may be partitioned by a user manually. As described elsewhere herein, design requirements may be used for determining a 3D surface or a 3D layer. For instance, a part may be partitioned into a stack of 3D layers according to different physical characteristics (e.g., stress direction) that under the design requirements. Design requirements can be selected from a group that includes, for example, strength, structural deflections, stress, strain, tension, shear, load capacity, stiffness, factor-of safety, weight, strength to weight ratio, envelop geometry, minimal print time, thermal performance, thermal capacitance, thermal conductance, electrical performance, electrical capacitance, electrical inductance, electrical resistance, porosity, infill, number of shells, layer height, extruder temperature, solid density, melt density, printing speed, print head movement speed, or the material and density to direct heat through a specific area of the part and the like.

Parametric representation of a layer or the 3D model may be created (operation 1003). The parametric representation may be constructed using the method as described in FIG. 3. Next, tool paths may be generated for a first layer (operation 1005). The first layer may be a curved layer or a layer having complex geometrics. Methods and algorithms for generating tool paths in a curved layer have been described in detail elsewhere herein. For instance, the process may begin with selecting a starting edge to guide the direction of a tool path. The starting edge can be any arbitrary edge. The starting edge, in some cases, may be determined according to a preferred fiber direction. Tool paths of constant width may be generated to fill in the first layer. Unfit region within the layer may be determined and filled using a given strategy as described above.

Next, tool paths for subsequent layers may be generated (operation 1007). The subsequent layers may have constant thickness. These layers may or may not have the same thickness across different layers. Unfit region in the height direction may be determined and filled using a given strategy as described above.

Once the tool paths for the 3D model are generated, one or more numerical control programming codes (e.g., G-code) may be produced. Then the G-code file may be transmitted to a 3D printer for execution (operation 1009).

There are various alternatives or modifications to the method of FIG. 10. For example, the operations can be performed in any order. Some of the operations may be precluded, some of the operation may be performed concurrently in one operation, some of the operation repeated, and some of the operation may comprise sub-operations of other operations. The method may also be modified in accordance with other aspects of the disclosure as provided herein.

The method for generating tool paths for printing may optionally comprise receiving user inputted data via a user interface and/or electronically outputting the result such as a 3D model with tool paths on the user interface. The result may be in any form such as text, numerical numbers, graphical elements, and the like. The result may comprise dynamically rendering the layer, 3D solid or part with one or more properties specified by the inputted parameters. For example, a user may provide input indicating adjustment of a toolpath for a given curved surface, upon receiving the input, the print head toolpath may be electronically applied to the corresponding surface outputted on a graphical user interface. In another example, user may provide input specifying how a part is partitioned or indicating selection of a starting layer. For instance, a user may be allowed to specify a rule for partitioning a part via the GUI. Alternatively or additionally, the 3D model may be partitioned by a user manually via the GUI. The user interface may also be configured to import files such as printing job files, standard CAD files, STL, STEP or IGES, and/or data specifying preferred fiber orientation.

In some cases, the user interface may incorporate a design environment, such as a web-based CAD platform or the like that users can employ to modify designs and submit designs or components of a design to printing resources. This may facilitate drag-and-drop fabrication of a complete, multi-part CAD design. A user may also or instead be able to select portions of an assembly and print only those portions. In some cases, the user interface may provide tools for model design, print previews, file repairs, topology optimization, size optimization (e.g., to fit the models in a build volume), hollowing, compensation for build flaws (e.g., shrinking, curling, and so on), surface texturing, optimized grouping, material selection, nesting, coloring, smoothing, contouring, multi-platform support, mesh repair, and so forth.

In some cases, the user interface may provide a photorealistic rendering mode that shows how the model will look when printed. In some cases, tool paths for a given layer, selected multiple layers, a 3D region, a part can be shown to a user within the user interface. The rendering may include support structures such as rafts and the like, as well as other features such as striations, surface textures and finish, and the like, or the rendering may omit some or all of these ancillary structures. The renderings may show surface finishes such as matte surfaces versus glossy surfaces. The rendering may be created using information pertaining to light sources (e.g., virtual lighting of the rendered model), layer heights, toolpaths, orientations, tessellations, colors, and so on.

The present disclosure provides computer systems that may be programmed or otherwise configured to implement devices, methods and systems of the present disclosure. The processor may be a hardware processor such as a central processing unit (CPU), a graphic processing unit (GPU), or a general-purpose processing unit. The processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

Figure 11:
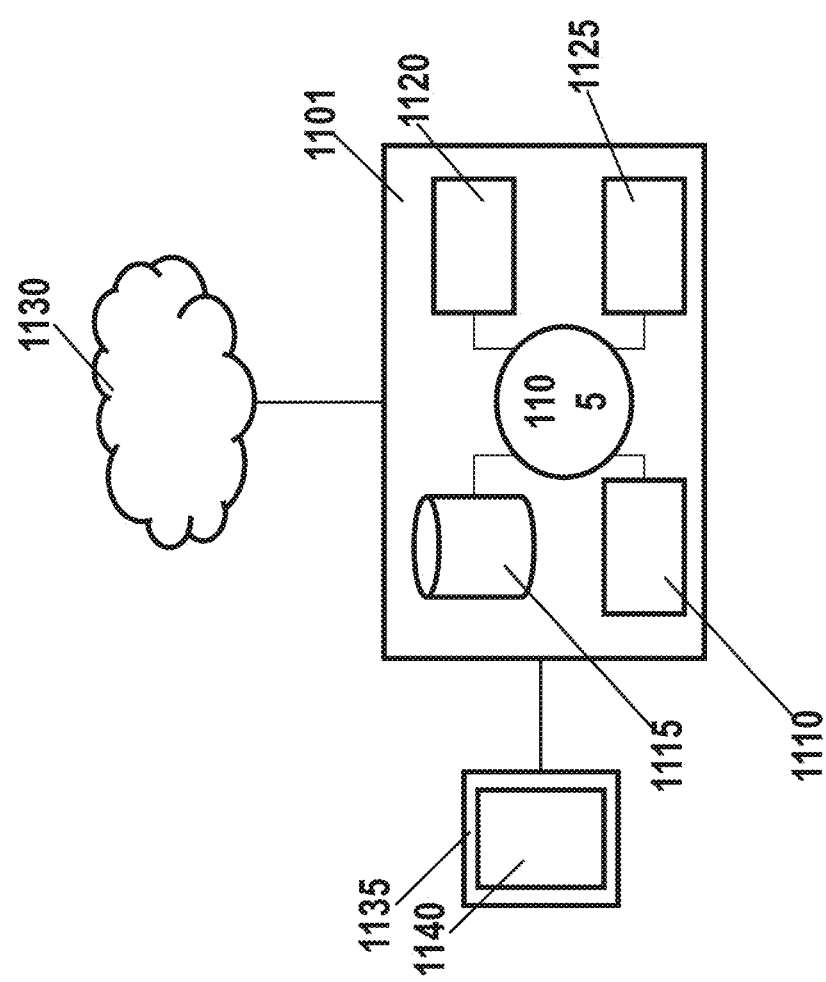
FIG. 11 shows a computer system that can be configured to implement any computing system disclosed in the present application.

In some embodiments, the processor may be a processing unit of a computer system. FIG. 11 shows a computer system 1101 that can be configured to implement any computing system disclosed in the present application. The computer system 1101 can comprise a mobile phone, a tablet, a wearable device, a laptop computer, a desktop computer, a central server, etc.

The computer system 1101 includes a central processing unit (CPU, also "processor" and "computer processor" herein) 1105, which can be a single core or multi core processor, or a plurality of processors for parallel processing. The CPU can be the processor as described above. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. In some cases, the communication interface may allow the computer to be in communication with another device such as the imaging device or audio device. The computer may be able to receive input data from the coupled devices for analysis. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

Methods and systems of the present disclosure can be implemented by way of one or more algorithms. An algorithm can be implemented by way of software upon execution by the central processing unit 1105. The algorithm can, for example, partition a computer model of a part according to a hierarchy, receive user inputted data for modifying one or more parameters and produce a machine code.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The memory 1110 can be a volatile or non-volatile, magnetic, semiconductor, tape, optical, removable, non-removable, or other type of storage device or tangible and/or non-transitory computer-readable medium that stores programs, such as the tool generation algorithms and operating system. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

The memory 1110 may store instructions that enable processor to execute one or more applications, such as the tool generation algorithms and operating system, and any other type of application or software available or executable on computer systems. Alternatively or additionally, the instructions, application programs, etc. can be stored in an internal and/or external database (e.g., a cloud storage system—not shown) that is in direct communication with computing device, such as one or more databases or memories accessible via one or more networks (not shown). The memory 1110 can include one or more memory devices that store data and instructions usable to perform one or more features provided herein. The memory 1110 can also include any combination of one or more databases controlled by memory controller devices (e.g., servers, etc.) or software, such as document management systems, Microsoft SQL databases, SharePoint databases, Oracle™ databases, Sybase™ databases, or other relational databases. Data used in the slicing process such as hierarchies, rules for portioning a model corresponding to each hierarchy, valid range for some or all of the parameters, printer configurations, printer specifications, and the like may be stored in the one or more databases.

The computer system 1101 may be communicatively connected to one or more remote memory devices (e.g., remote databases—not shown) through a network. The remote memory devices can be configured to store information that computer system 1101 can access and/or manage. By way of example, the remote memory devices may be document management systems, Microsoft SQL database, SharePoint databases, Oracle™ databases, Sybase™ databases, Cassandra, HBase, or other relational or non-relational databases or regular files. Systems and methods provided herein, however, are not limited to separate databases or even to the use of a database.

The computer system 1101 can communicate with one or more remote computer systems through the network 1130. For instance, the computer system 1101 can communicate with a remote computer system of a user. Examples of remote computer systems include personal computers, slate or tablet PC's, smart phones, personal digital assistants, and so on. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface 1140 for providing, for example, a scanning interface or a footwear purchase interface. Examples of UI's include, without limitation, a graphical user interface (GUI) and web-based user interface. The display may be the same display 24 as described in FIG. 1. Alternatively, the user interface may be a separate user interface.

Methods and systems of the present disclosure can be implemented by way of one or more algorithms. An algorithm can be implemented by way of software upon execution by the central processing unit 1105.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method comprising:
generating a parametric representation of a curved surface of a computer model of a three-dimensional (3D) object comprising the curved surface, wherein the parametric representation comprises a first edge of a first tool path and a second edge opposite of the first edge of the first tool path, wherein the first edge is oriented along a direction of fiber in a fiber-reinforced material, the direction of the fiber being determined based on measurements of stiffness of the computer model, and wherein the second edge is parallel to at least a portion of the first edge;
generating the first tool path for a first layer of the fiber-reinforced material, wherein the first tool path is defined by the first edge and the second edge in the parametric representation;
generating printing instructions based on the first tool path; and
fabricating, by a 3D printer comprising a print head, the 3D object by using the printing instructions to move the print head according to the first tool path.

2. The method of claim 1, wherein the curved surface is a three-dimensional curved surface.

3. The method of claim 1, further comprising determining the direction using finite element analysis.

4. The method of claim 1, wherein the first edge and the second edge are separated by a controlled width.

5. The method of claim 1, wherein the first edge and the second edge are separated by a constant width.

6. The method of claim 1, further comprising determining a parametric point of the parametric representation as part of an incomplete tool path.

7. The method of claim 6, wherein the parametric point at least partially defines a region that is incapable of fitting a 3D tool path of constant width.

8. The method of claim 1, wherein the first edge is oriented along the direction of the fiber in the fiber-reinforced material to increase stiffness in an axial direction along the first tool path.

9. A system comprising:
a computing device configured to:
(a) generate a parametric representation of a curved surface of a computer model of a three-dimensional (3D) object comprising the curved surface, wherein the parametric representation comprises a first edge of a first tool path and a second edge opposite of the first edge of the first tool path, wherein the first edge is oriented along a direction of fiber in a fiber-reinforced material, the direction of the fiber being determined based on measurements of stiffness of the computer model, and wherein the second edge is parallel to at least a portion of the first edge,
(b) generate the first tool path for a first layer of the fiber-reinforced material, wherein the first tool path is defined by the first edge and the second edge in the parametric representation, and
(c) generate printing instructions based on the first tool path; and a 3D printer comprising a print head and configured to fabricate the 3D object by using the printing instructions to move the print head according to the first tool path.

10. The system of claim 9, wherein the computing device is further configured to determine the direction using finite element analysis.

11. The system of claim 9, wherein the first edge and the second edge are separated by a controlled width.

12. The system of claim 9, wherein the first edge and the second edge are separated by a constant width.

13. The system of claim 9, wherein the computing device is further configured to determine a parametric point of the parametric representation as part of an incomplete tool path.

14. The system of claim 13, wherein the parametric point at least partially defines a region that is incapable of fitting a 3D tool path of constant width.

15. The system of claim 9, wherein the first edge is oriented along the direction of the fiber in the fiber-reinforced material to increase stiffness in an axial direction along the first tool path.

\* \* \* \* \*